(12) United States Patent
Murase et al.

(10) Patent No.: US 7,619,851 B2
(45) Date of Patent: Nov. 17, 2009

(54) CARTRIDGE HOLDER WITH A CARTRIDGE HEIGHT POSITION LOCKING MECHANISM ACCOMMODATING TAPE CARTRIDGES OF DIFFERING TAPE WIDTHS

(75) Inventors: Kazuhide Murase, Atsugi (JP); Kazuya Tamura, Atsugi (JP); Ryoichi Annen, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 505 days.

(21) Appl. No.: 11/413,843

(22) Filed: Apr. 28, 2006

(65) Prior Publication Data

US 2007/0008647 A1    Jan. 11, 2007

(30) Foreign Application Priority Data

Jun. 15, 2005   (JP)   ............... 2005-175549

(51) Int. Cl.
*G11B 5/008* (2006.01)
(52) U.S. Cl. ........................................ 360/94
(58) Field of Classification Search ............ 360/94, 360/90, 85, 96.51; 242/336
See application file for complete search history.

(56) References Cited

U.S. PATENT DOCUMENTS

| | | | | |
|---|---|---|---|---|
| 4,992,894 | A * | 2/1991 | Ohashi ..................... | 360/94 |
| 5,617,271 | A * | 4/1997 | Nishimura et al. ......... | 360/94 |
| 5,822,149 | A * | 10/1998 | Takase et al. .............. | 360/94 |
| 6,111,721 | A * | 8/2000 | Kim et al. .................. | 360/94 |
| 6,155,509 | A * | 12/2000 | d'Alayer de Costemore d'Arc et al. ...................... | 242/336 |
| 6,266,206 | B1 * | 7/2001 | Suzuki ................... | 360/96.51 |
| 7,379,263 | B2 * | 5/2008 | Tamura et al. ............. | 360/85 |
| 2003/0086201 | A1 * | 5/2003 | Rudi et al. ................ | 360/90 |

FOREIGN PATENT DOCUMENTS

| | | |
|---|---|---|
| GB | 2 419 728 A | 5/2006 |
| GB | 2 419 729 A | 5/2006 |
| GB | 2 419 730 A | 5/2006 |
| GB | 2 419 731 A | 5/2006 |
| WO | 2005/045824 A1 | 5/2005 |

* cited by examiner

*Primary Examiner*—A. J. Heinz
(74) *Attorney, Agent, or Firm*—Ladas & Parry LLP

(57) ABSTRACT

A cartridge holder is disclosed that includes a cartridge supporting member that supports an inserted cartridge corresponding to a first cartridge or a thicker second cartridge; a cartridge upper face holding member that is normally positioned at a first height position for holding down the first cartridge; a cartridge upper face holding member supporting mechanism configured to move the cartridge upper face holding member with respect to the cartridge supporting member; and a lock mechanism configured to lock the cartridge upper face holding member in the first height position. The cartridge supporting member and the cartridge upper face holding member define a cartridge accommodating space. The lock mechanism remains locked when the first cartridge is inserted, and unlocks when the second cartridge is inserted. When the second cartridge is inserted, the cartridge upper face holding member is raised, and the size of the cartridge accommodating space is changed.

7 Claims, 22 Drawing Sheets

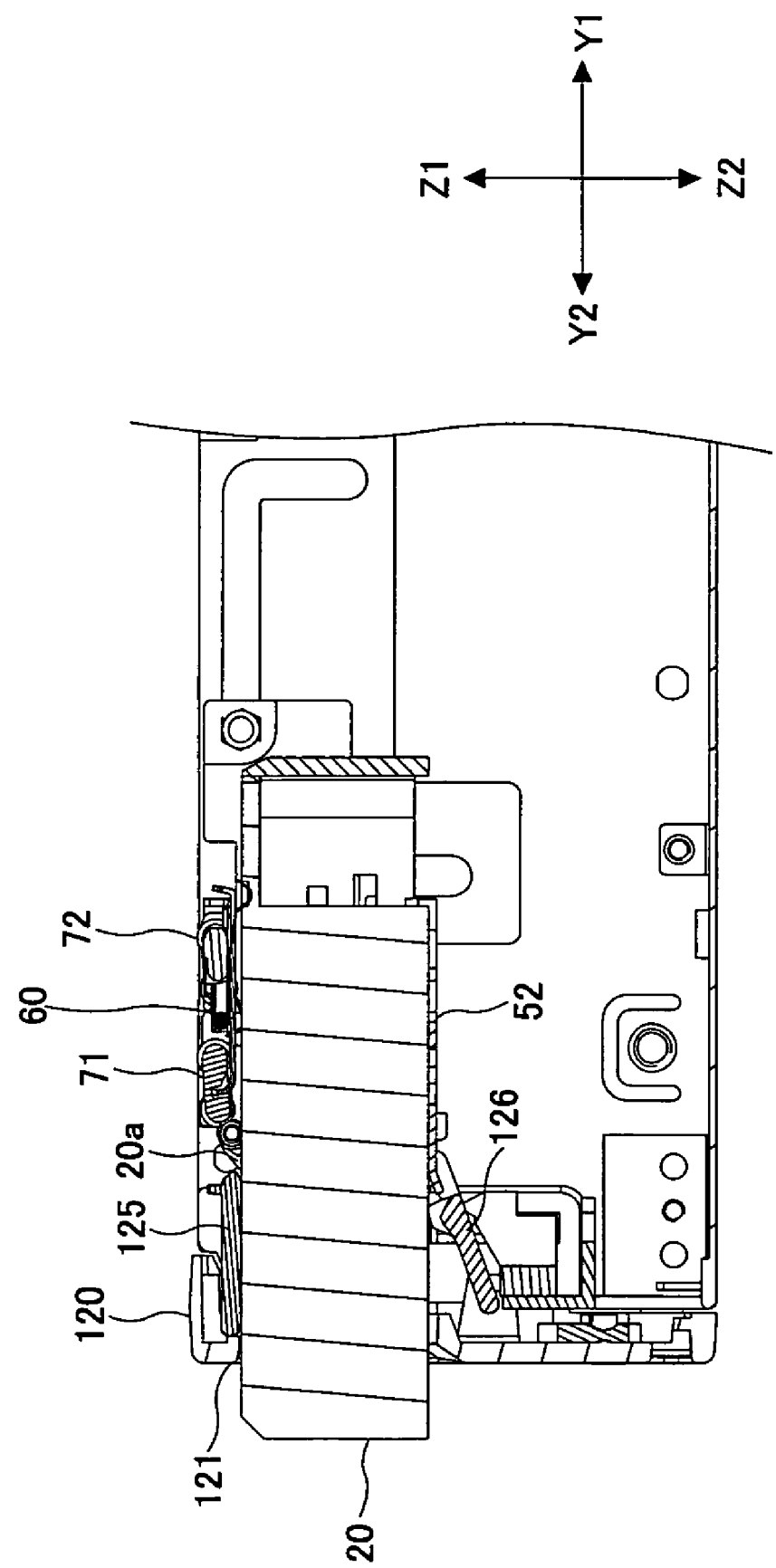

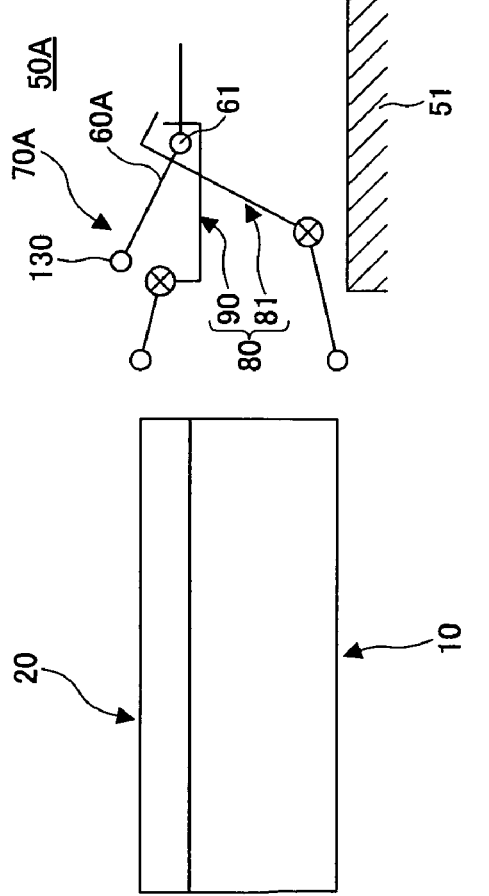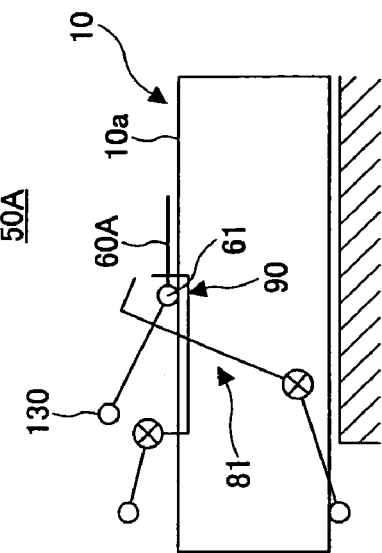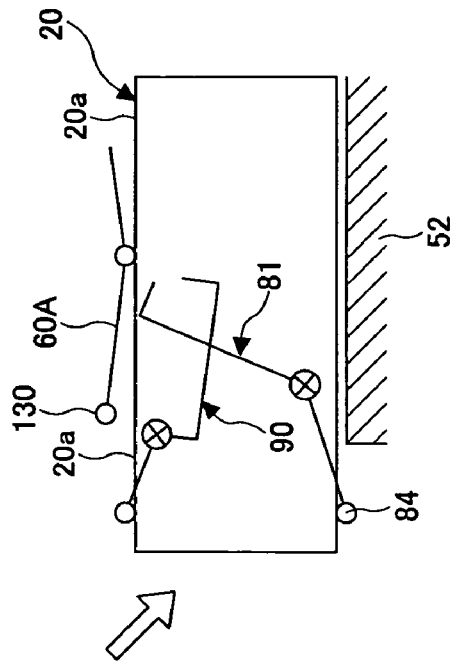
FIG. 13A
FIG. 13B
FIG. 13C

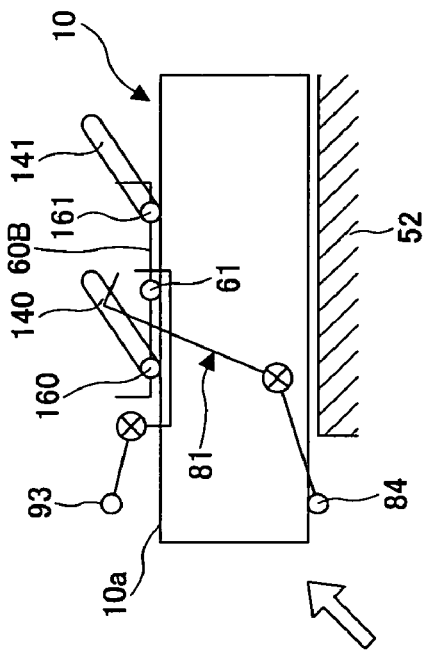
FIG.18B
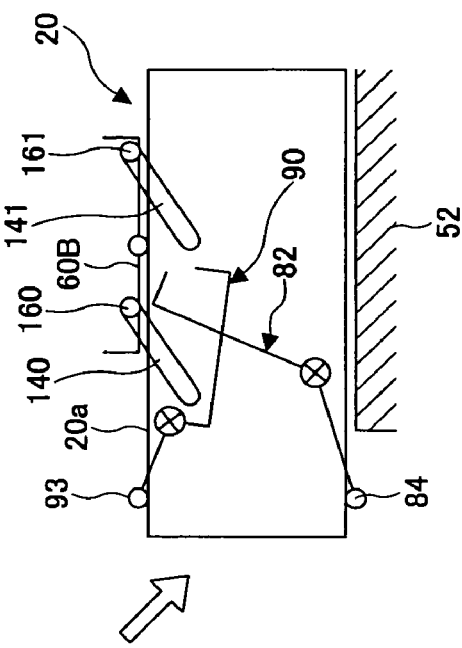
FIG.18C
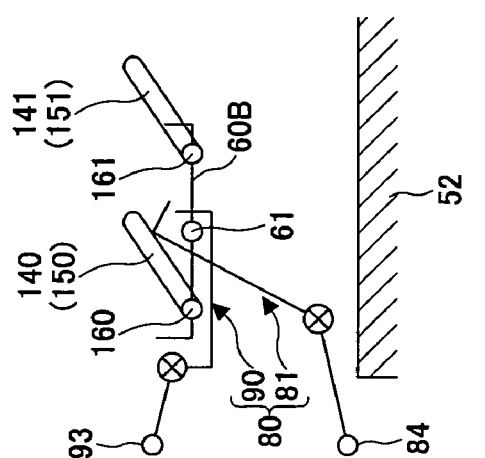
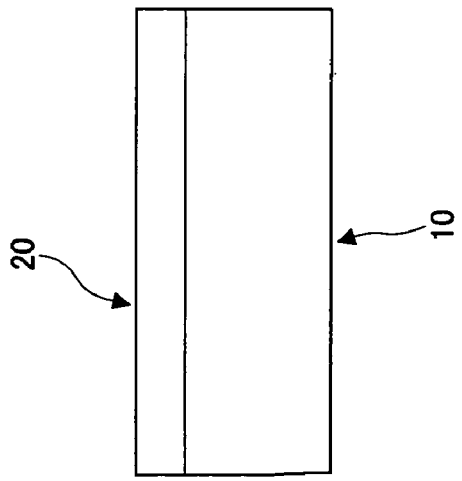
FIG.18A

CARTRIDGE HOLDER WITH A CARTRIDGE HEIGHT POSITION LOCKING MECHANISM ACCOMMODATING TAPE CARTRIDGES OF DIFFERING TAPE WIDTHS

BACKGROUND OF THE INVENTION

1. Field of the Invention

The present invention relates to a cartridge holder for a magnetic recording/playback apparatus.

2. Description of the Related Art

A streamer apparatus as a peripheral storage device for a computer that includes a rotating drum and a tape loading mechanism and uses a tape cartridge like the VTR is being commercialized.

It is noted that a current streamer apparatus has a relatively large storage capacity of 72 GBytes at compression mode, for example. However, there is an ever growing demand for increased storage capacity, and in turn, manufacturers are developing techniques for increasing the storage capacity of the streamer apparatus.

One way of increasing the storage capacity involves enabling the use of a new tape cartridge that accommodates a magnetic tape with a wider tape width compared to the tape width of the magnetic tape of the current tape cartridge.

It is noted that a magnetic recording/playback apparatus includes a tape cartridge automatic loading mechanism that is configured to automatically load a tape cartridge by moving a tape cartridge holder that holds the tape cartridge inserted therein.

Accordingly, in order to enable use of the new tape cartridge as is described above, the tape cartridge holder has to be capable of properly holding the current tape cartridge as well as the new tape cartridge so that both the current tape cartridge and the new tape cartridge may be selectively inserted therein.

However, a tape cartridge holder of a conventional tape cartridge automatic loading mechanism is only capable of holding a tape cartridge of one size.

SUMMARY OF THE INVENTION

According to one embodiment of the present invention, a tape cartridge holder is provided that is capable of properly holding a current tape cartridge and a new tape cartridge that are selectively inserted therein.

According to one specific embodiment of the present invention, a cartridge holder is provided into which one of a first cartridge and a second cartridge having a greater dimension than the first cartridge is selectively inserted, the cartridge holder including:

a cartridge supporting member having a horizontal plate portion, a first side plate portion, and a second side plate portion that is configured to support a bottom face, a first side face, and a second side face of an inserted cartridge corresponding to one of the first cartridge and the second cartridge;

a cartridge upper face holding member configured to hold down an upper face of the inserted cartridge which cartridge upper face holding member is normally positioned at a first height position for holding down an upper face of the first cartridge;

a cartridge upper face holding member supporting mechanism configured to support the cartridge upper face holding member and move the cartridge upper face holding member in a direction for changing the height position of the cartridge upper face holding member with respect to the cartridge supporting member; and a lock mechanism configured to lock the cartridge upper face holding member in the first height position;

wherein the cartridge supporting member and the cartridge upper face holding member define a cartridge accommodating space for accommodating the inserted cartridge;

the lock mechanism is configured to remain locked when the first cartridge is inserted, and be unlocked when the second cartridge is inserted; and when the second cartridge is inserted, the cartridge upper face holding member is moved to a second height position that is higher than the first height position, and the size of the cartridge accommodating space is changed to correspond to the size of the second cartridge.

BRIEF DESCRIPTION OF THE DRAWINGS

FIG. 12 is a side view of the tape cartridge holder according to the first embodiment as shown in FIG. 11;

FIGS. 13A-13C are skeleton diagrams of a tape cartridge holder according to a second embodiment of the present invention, FIG. 13A showing an initial state, FIG. 13B showing a state in which the current tape cartridge is inserted, and FIG. 13C showing a state in which the new tape cartridge is inserted;

FIGS. 18A-18C are skeleton diagrams of a tape cartridge holder according to a third embodiment of the present invention, FIG. 18A showing an initial state, FIG. 18B showing a state in which the current tape cartridge is inserted, and FIG. 18C showing a state in which the new tape cartridge is inserted;

DETAILED DESCRIPTION OF THE PREFERRED EMBODIMENTS

In the following, preferred embodiments of the present invention are described with reference to the accompanying drawings.

Embodiment 1

[Streamer Apparatus 30, Current Tape Cartridge 10, and New Tape Cartridge 20]

Figure 1:
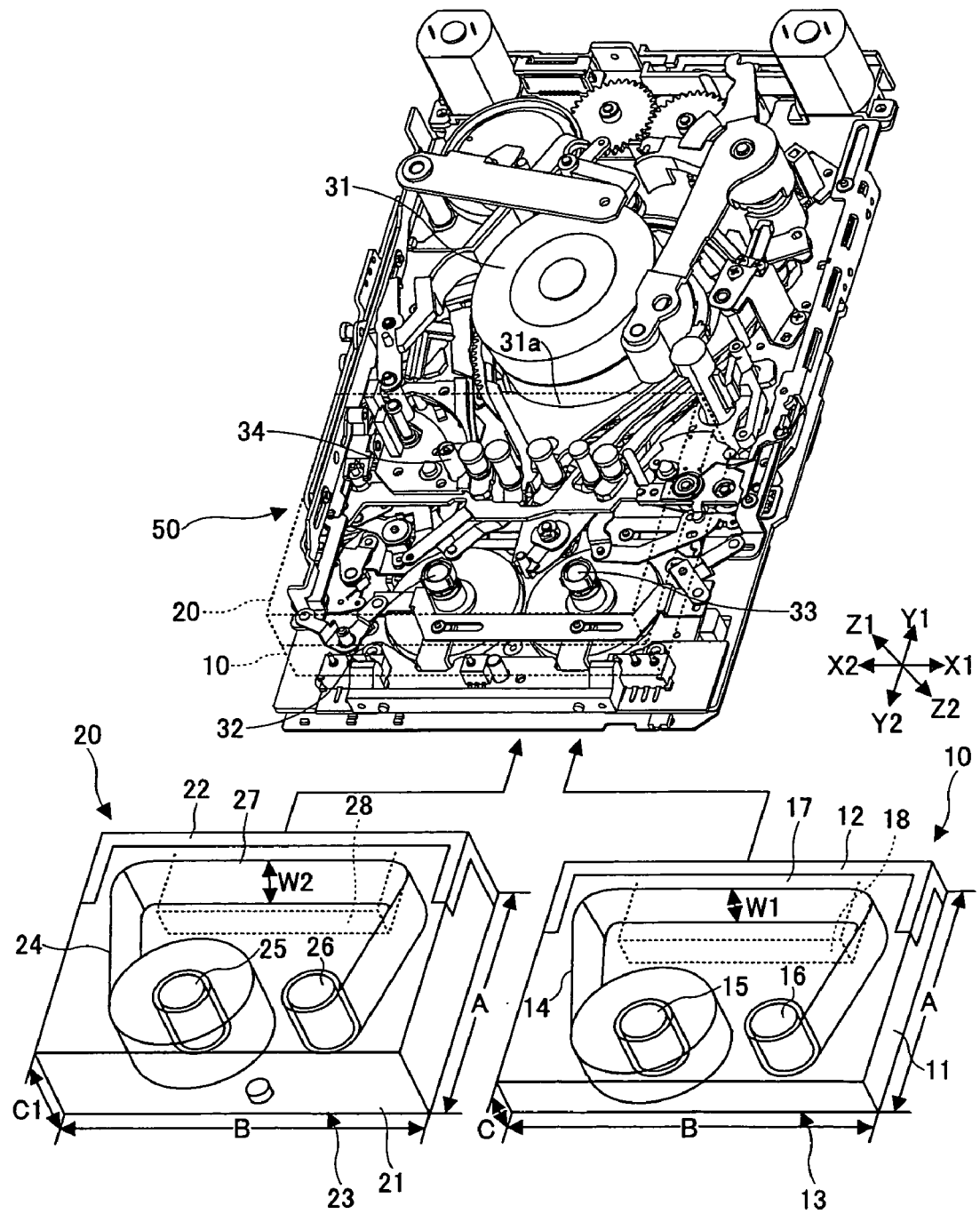
FIG. 1 is a diagram showing a streamer apparatus that uses a tape cartridge holder according to an embodiment of the present invention, a current tape cartridge, and a new tape cartridge.

FIG. 1 is a diagram showing a streamer apparatus 30 that uses a tape cartridge holder according to an embodiment of the present invention, a current tape cartridge 10, and a new tape cartridge 20. It is noted that in the following drawings, directions X1-X2 represent width directions, directions Y1-Y2 represent depth directions, and directions Z1-Z2 represent height directions.

The streamer apparatus 30 includes a rotating drum 31, a magnetic tape loading mechanism 34 configured to pull out a magnetic tape from an inserted tape cartridge and load the magnetic tape into a predetermined tape path, reel shafts 32 and 33, and a tape cartridge holder 50 that is capable of properly holding a first cartridge corresponding to the current tape cartridge 10 and a second cartridge corresponding to the new tape cartridge 20.

The current tape cartridge 10 has outer dimensions of length A×width B×height C. The current tape cartridge 10 includes a cartridge main frame 13 having a box structure 11, a front side lid 12, and a bottom slide plate (not shown); a magnetic tape 14 accommodated inside the main frame 13 and having a width W1 of 4 mm, the magnetic tape 14 being wound around a supply reel 15 and a winding reel 16 and forming a tape path 17 along the inner face of the lid 12; and a pole accommodating space 18 at the front face side of the bottom plate of the main frame 13 that is configured to open when the current tape cartridge 10 is loaded.

The new tape cartridge 20 has outer dimensions of length A×width B×height C1. The new tape cartridge 20 includes a cartridge main frame 23 made of a box structure 21, a front side lid 22, and a bottom slide plate (not shown); a magnetic tape 24 accommodated inside the main frame 23 and having a width W2 of 8 mm, the magnetic tape 24 being wound around a supply reel 25 and a winding reel 26 and forming a tape path 27 along the inner face of the lid 22; and a pole accommodating space 28 at the front face side of the bottom plate of the main frame 23 that is configured to open when the new tape cartridge 20 is loaded. It is noted that the length A and the width B of the new tape cartridge 20 is the same as the length A and the width B of the current tape cartridge 10, and the height C1 of the new tape cartridge 20 is 1.5 times the height C of the current tape cartridge 10.

[Tape Cartridge Holder 50]

Figure 2:
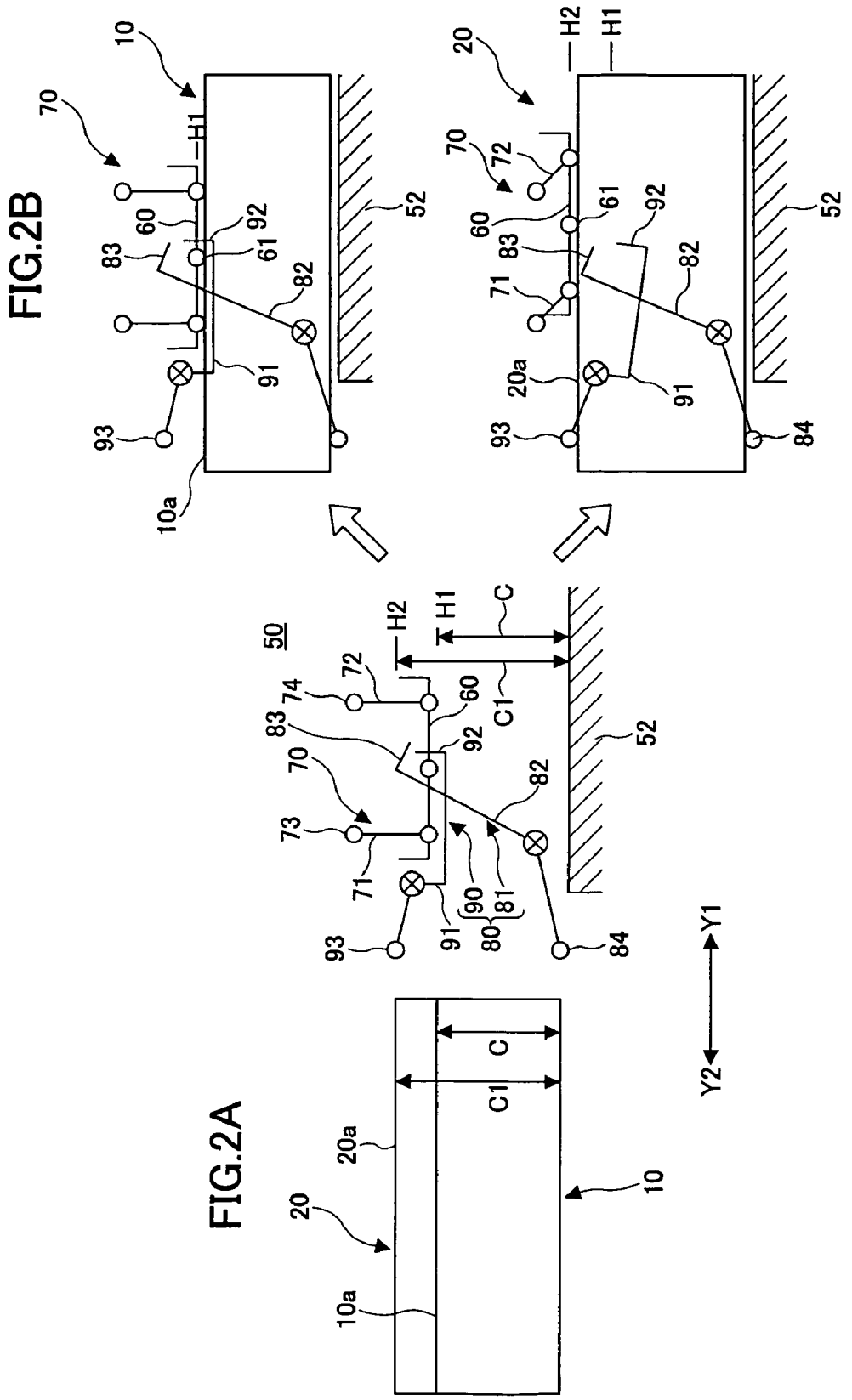
FIGS. 2A-2C are skeleton diagrams of a tape cartridge holder according to a first embodiment of the present invention, FIG. 2A showing an initial state, FIG. 2B showing a state in which the current tape cartridge is inserted, and FIG. 2C showing a state in which the new tape cartridge is inserted.

FIG. 2A is a skeleton diagram of a tape cartridge holder 50 according to an embodiment of the present invention. FIG. 2B is a diagram showing a state in which the current tape cartridge 10 is inserted into the tape cartridge holder 50. FIG. 2C is a diagram showing a state in which the new tape cartridge 20 is inserted into the tape cartridge holder 50.

Figure 3:
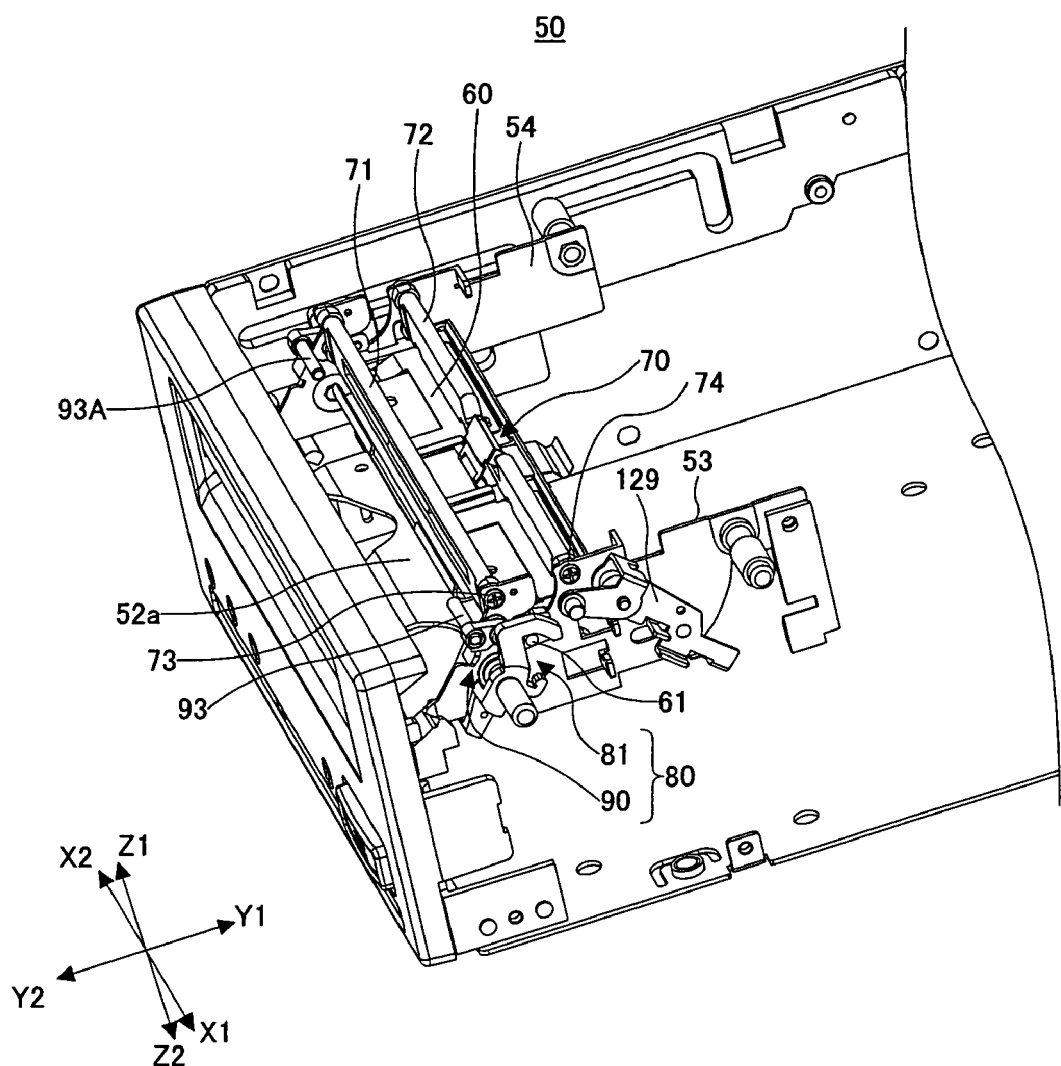
FIG. 3 is a perspective view of the tape cartridge holder according to the first embodiment.
Figure 4:
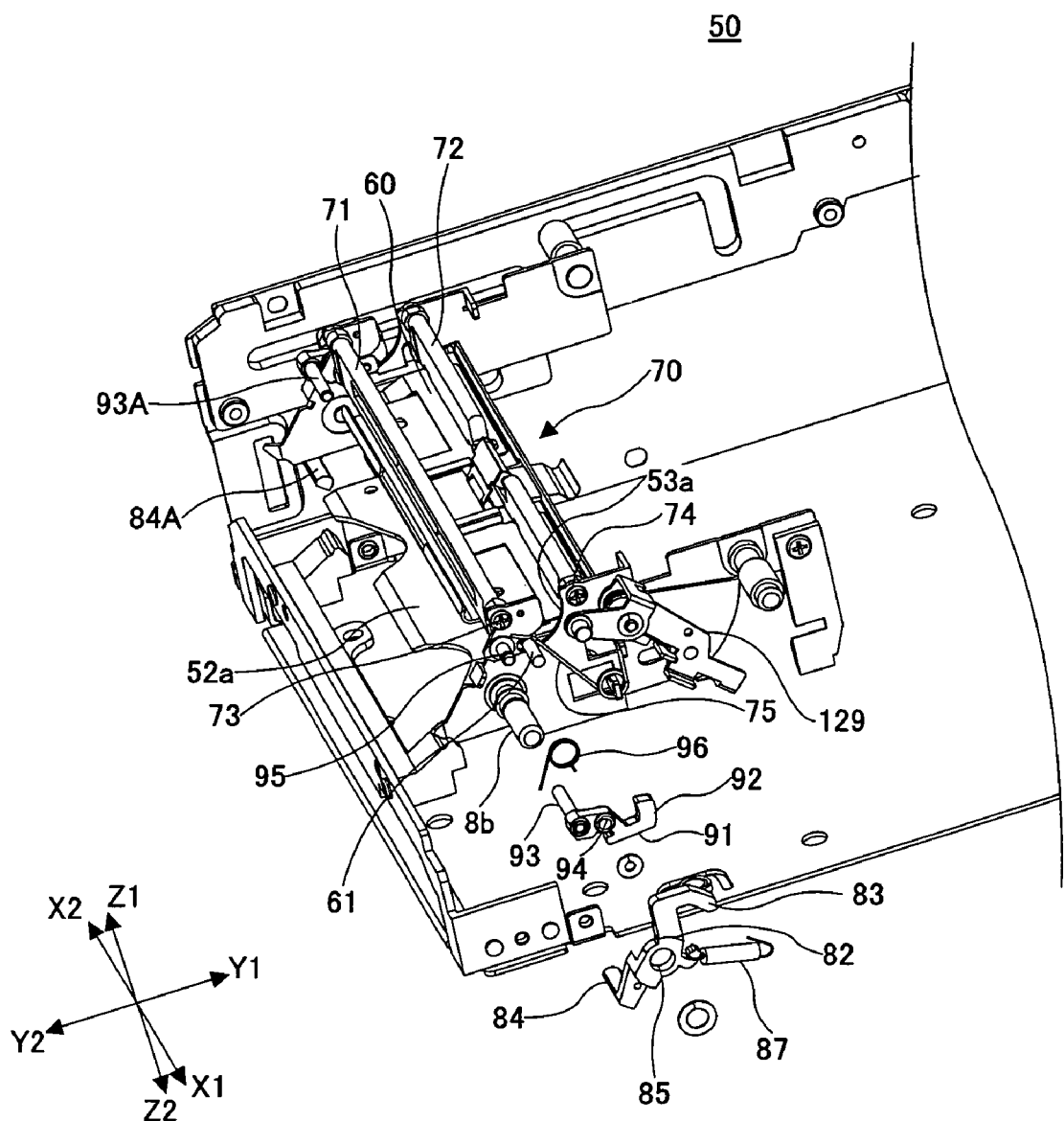
FIG. 4 is an exploded perspective view of the tape cartridge holder showing a first lock lever and a second lock lever.
Figure 5:
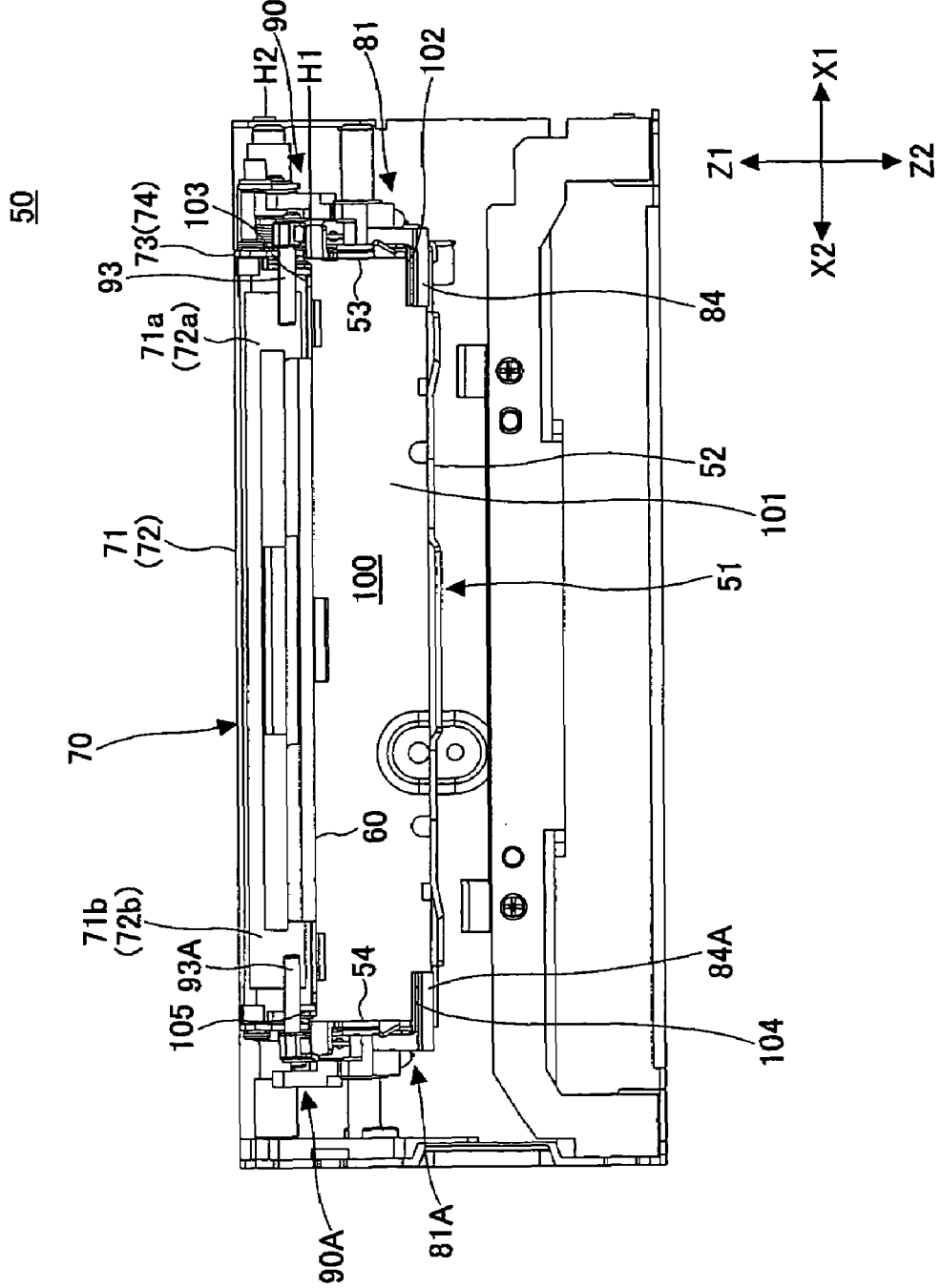
FIG. 5 is a front view of the tape cartridge holder according to the first embodiment.
Figure 6:
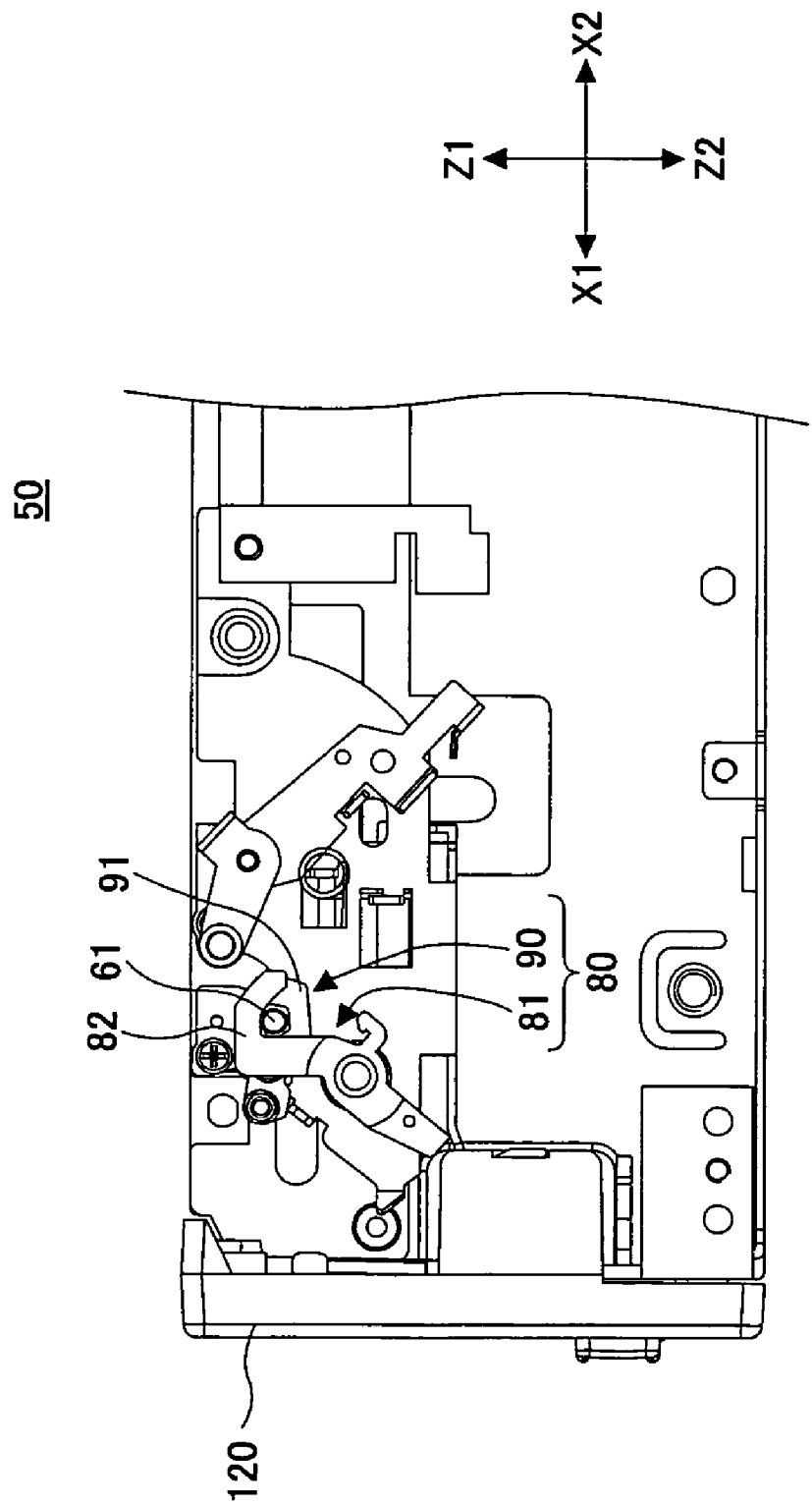
FIG. 6 is a side view of the tape cartridge holder according to the first embodiment.
Figure 7:
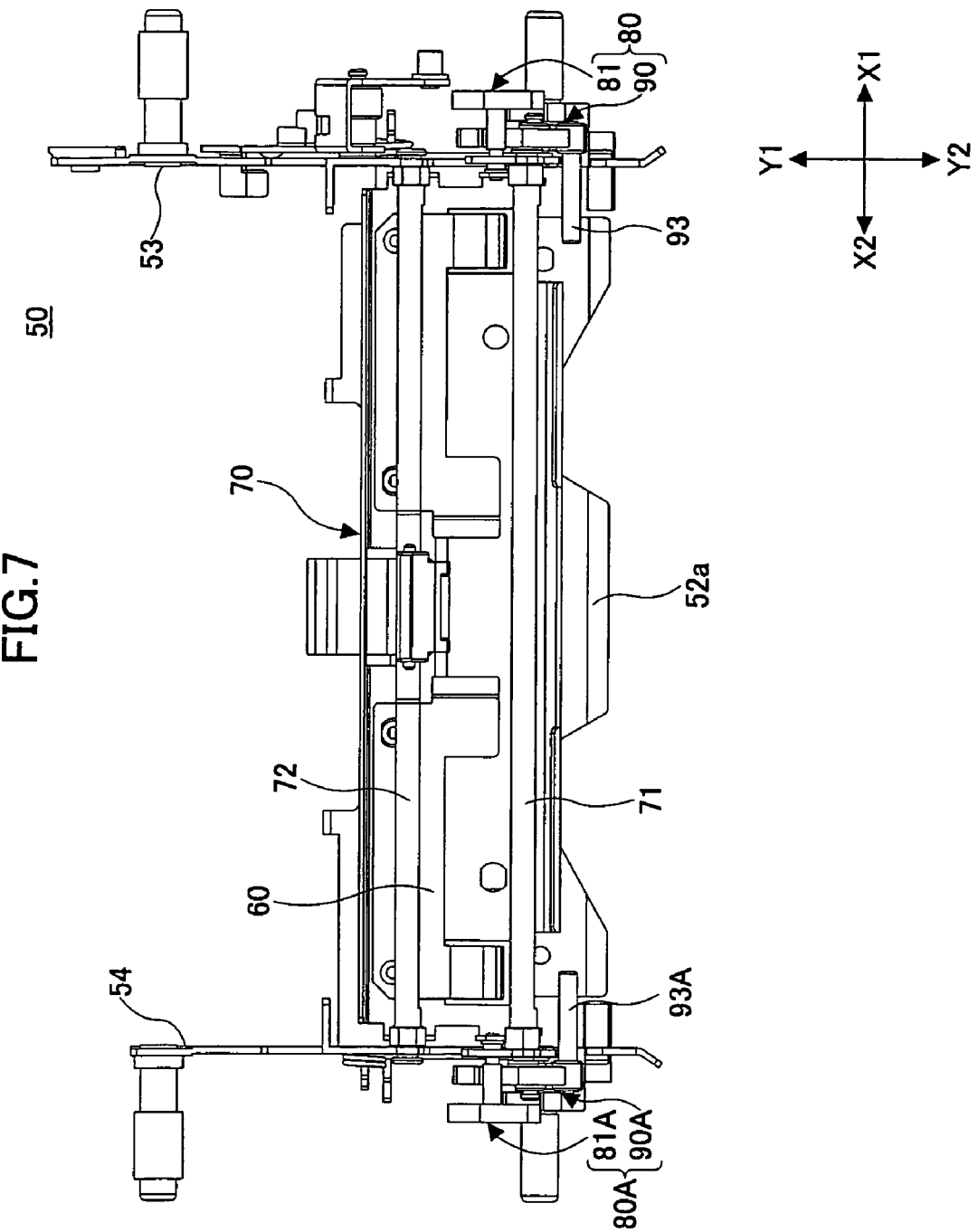
FIG. 7 is a plan view of the tape cartridge holder according to the first embodiment.
Figure 8:
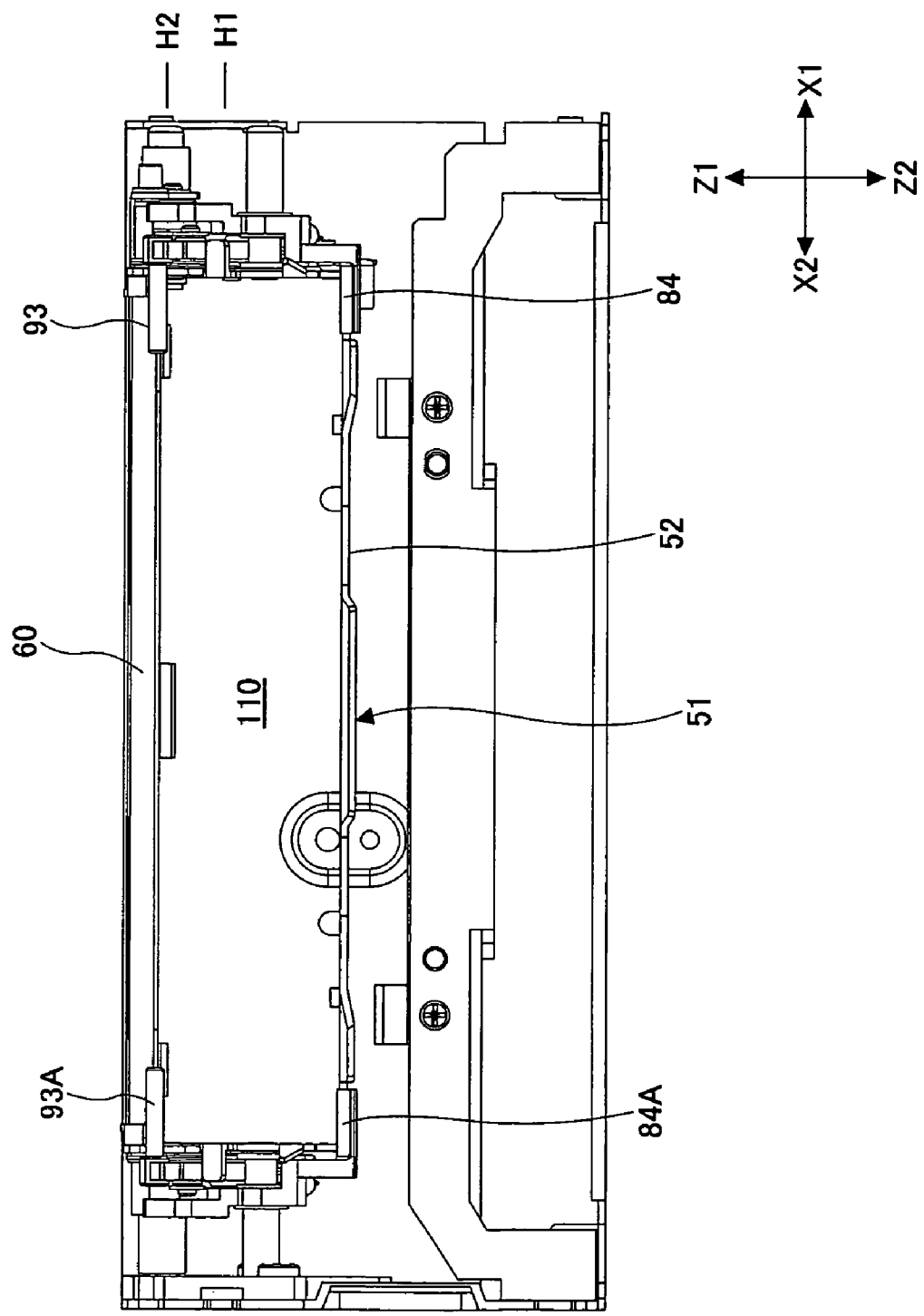
FIG. 8 is a front view of the tape cartridge holder according to the first embodiment showing where a tape cartridge accommodating space is enlarged.

FIG. 3 is a perspective view of the tape cartridge holder 50 in an initial state. FIG. 4 is an exploded perspective view of the tape cartridge holder 50 of FIG. 3 showing first and second lock members 82 and 91. FIG. 5 is a front view of the tape cartridge holder 50 in the initial state. FIG. 6 is a side view of the tape cartridge holder 50 in the initial state. FIG. 7 is a plan view of the tape cartridge holder 50 in the initial state. FIG. 8 is a front view of the tape cartridge holder 50 showing where a tape cartridge accommodating space is enlarged.

It is noted that the tape cartridge holder 50 is configured to be symmetrical with respect to a center line extending in the Y1-Y2 directions; that is, the X1 side configuration and the X2 side configuration of the tape cartridge holder 50 are substantially identical. Accordingly, in the following, the X side configuration of the tape cartridge holder 50 is described.

As is shown in the drawings, the tape cartridge holder 50 includes a cartridge supporting member 51, a cartridge upper face holding member 60, a cartridge upper face holding member supporting mechanism 70, and a double lock mechanism 80. The double lock mechanism 80 includes a first lock mechanism 81 and a second lock mechanism 90.

The cartridge supporting member 51 is configured into a U shape when viewed from the Y2 side, and includes a horizontal plate portion 52, and side plate portions 53 and 54 arranged at the sides of the horizontal plate portion 52. The horizontal plate portion 52 includes an overhanging portion 52a that extends in the Y2 direction.

The cartridge upper face holding member supporting mechanism 70 includes a first suspending member 71 and a second suspending member 72 that are suspended between the side plate portions 53 and 54 so that their respective side ends are rotatably supported by the side plate portions 53 and 54. The first suspending member 71 is supported by a shaft supporting portion 73, and the second suspending member 72 is supported by a shaft supporting portion 74. The first suspending member 71 is arranged into a reverse U shape viewed from the Y2 side, and includes arm portions 71a and 71b extending in the Z2 direction that are respectively arranged at the X1 side and the X2 side of the first suspending member 71. Similarly, the second suspending member 72 is arranged into a reverse U shape viewed from the Y2 side, and includes arm portions 72a and 72b extending in the Z2 direction that are respectively arranged at the X1 side and the X2 side of the second suspending member 72. The arm portions 71a, 71b, 72a, and 72b are disposed at positions corresponding to the corners of a rectangle when viewed from the Z1 side.

The cartridge upper face holding member 60 is arranged into a rectangular shape and is supported by the edges of the arm portions 71a, 71b, 72a, and 72b. Specifically, corner portions of the cartridge upper face holding member 60 are rotatably coupled to the arm portions 71a, 71b, 72a, and 72b.

The first and second suspending members 71 and 72 are configured to rotate in a pendulum-like manner, and in turn, the cartridge upper face holding member 60 is configured to move between an initial height H1 as is shown in FIGS. 2A and 2B and a raised height H2 as is shown in FIG. 2C. It is noted that the initial height H1 corresponds to the height of the current tape cartridge 10, and the raised height H2 corresponds to the height of the new tape cartridge 20.

As is shown in FIG. 5, in the initial state, a current tape cartridge accommodating space 100 having dimensions corresponding to the dimensions of the current tape cartridge 10 is defined by the cartridge supporting member 51 and the cartridge upper face holding member 60. The current tape cartridge accommodating space 100 has a rectangular inlet portion 101 arranged at the Y2 side. The inlet portion 101 has four corners; namely, a (X1, Z2) side corner 102, a (X1, Z1) side corner 103, a (X2, Z2) side corner 104, and a (X2, Z1) side corner 105.

As is shown in FIG. 8, when the cartridge upper face holding member 60 moves up to the raised height H2, the current tape cartridge accommodating space 100 is enlarged in the Z1 direction to realize a new tape cartridge accommodating space 110 having dimensions corresponding to the dimensions of the new tape cartridge 20.

As is shown in FIG. 4, the cartridge upper face holding member 60 includes a lock pin 61 arranged at its X1 side. The lock pin 61 is arranged to extend through a long trench 53a formed at the side plate portion 53 and protrude from the X1 side of the side plate portion 53. It is noted that a force in the Y2 direction is applied to the lock pin 61 by an arm portion of a torsion coil spring member 75 that is attached to the side plate portion 53.

Also, the first lock mechanism 81 includes a first lock lever 82. The first lock lever 82 includes a hook portion 83 arranged on one side, and a cartridge detecting pin 84 arranged on the other side. The first lock lever 82 also includes a hole 85 that engages a shaft 86 arranged on the side plate portion 53. A force in the clockwise direction is applied to the first lock lever 82 by a spring member 87 so that the hook portion 83 engages the lock pin 61 from the Z1 side. The cartridge detecting pin 84 is disposed at the (X1, Z2) side corner 102 of the inlet portion 101 of the current tape cartridge accommodating space 100 as is shown in FIG. 5, and extends in the X2 direction.

Similarly, the second lock mechanism 90 includes a second lock lever 91. The second lock lever 91 includes a hook portion 92 arranged on one side, and a cartridge detecting pin 93 arranged on the other side. The second lock lever 91 also includes a hole 94 that engages a shaft 95 arranged on the side plate portion 53. A force in the counterclockwise direction is applied to the second lock lever 91 by a spring member 96 so that the hook portion 92 engages the lock pin 61 from the Z2 side. The cartridge detecting pin 93 is disposed at the (X1, Z1) side corner 103 of the inlet portion 101 of the current tape cartridge accommodating space 100 as is shown in FIG. 5, and extends in the X2 direction.

It is noted that a first lock mechanism 81A and a second lock mechanism 90A are arranged at the X2 side of the tape cartridge holder 50, and their corresponding cartridge detecting pins 84A and 93A are respectively disposed at the (X2, Z2) side corner 104 and the (X2, Z1) side corner 105 of the inlet portion 101 of the current tape cartridge accommodating space 100.

As can be appreciated from the above descriptions, in the initial state, the cartridge upper face holding member 60 is double locked at its X1 side and X2 side.

[Insertion of Current Tape Cartridge 10]

An operator may hold a rear side portion of the current tape cartridge 10 to insert the front side portion of this current tape cartridge 10 into a loading slot 121 of a front panel 120.

Figure 9:
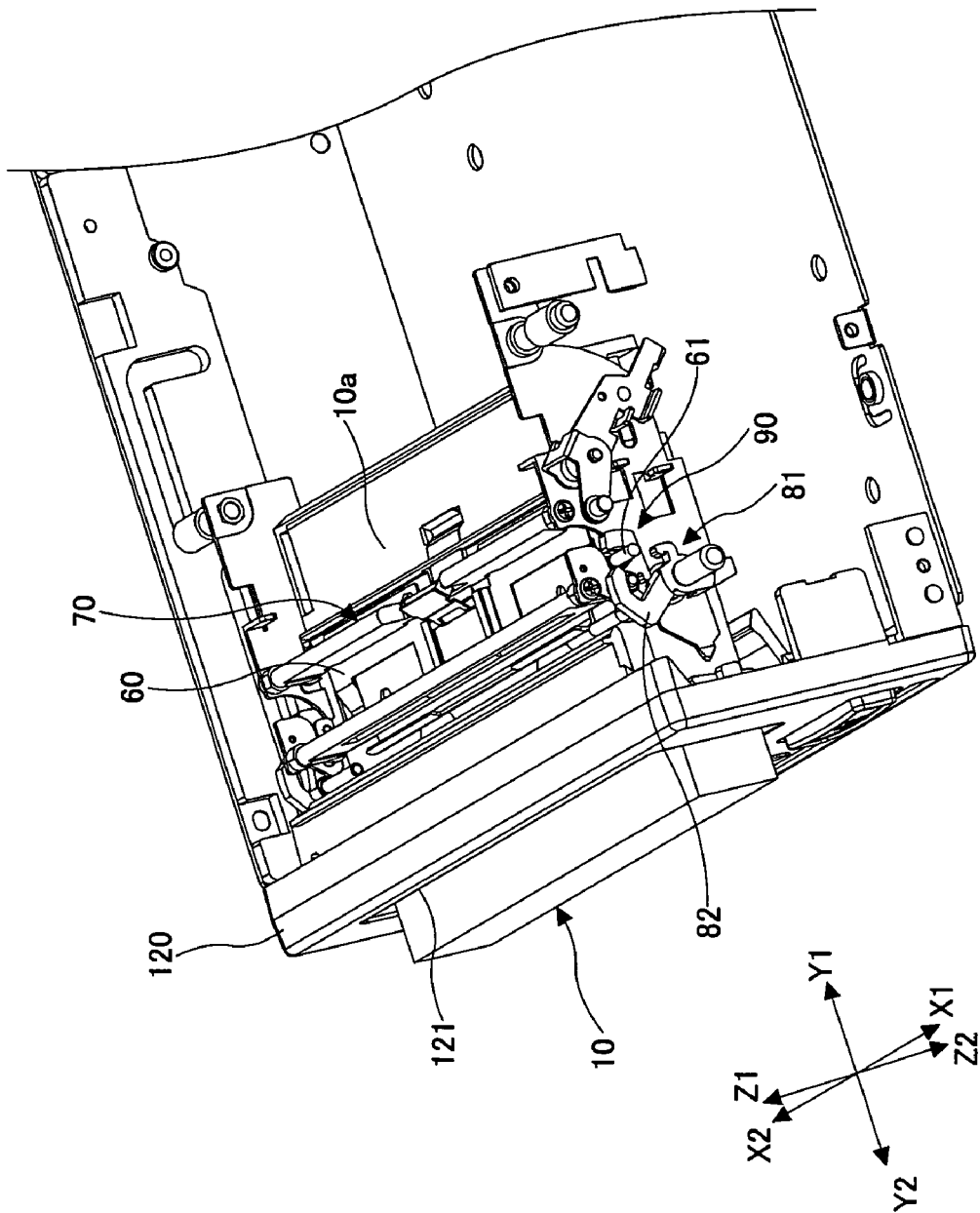
FIG. 9 is a perspective view of the tape cartridge holder according to the first embodiment where the current tape cartridge is inserted.
Figure 10:
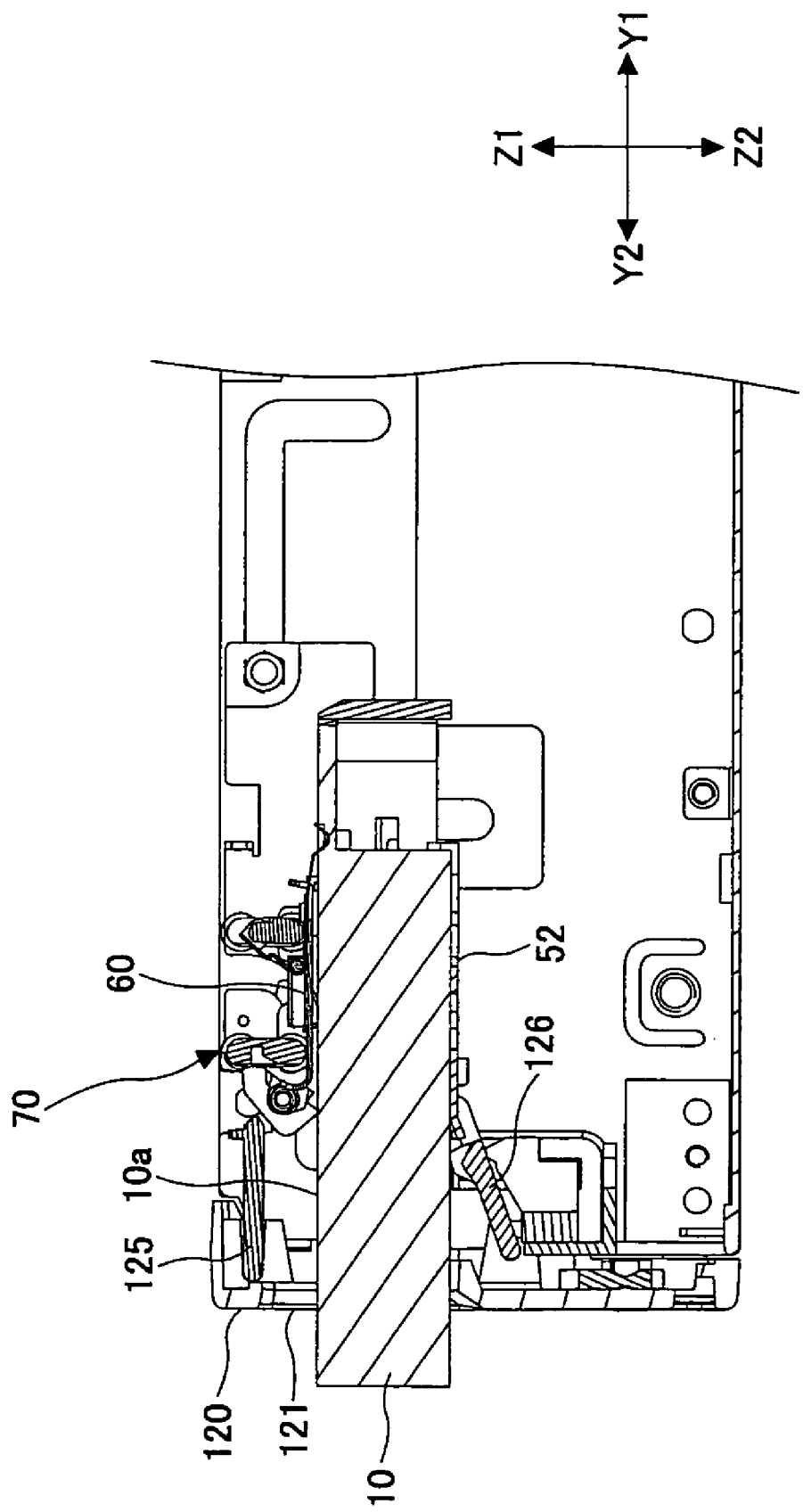
FIG. 10 is a side view of the tape cartridge holder according to the first embodiment as shown in FIG. 9.

In turn, the front portion of the current tape cartridge 10 pushes open flaps 125 and 126 (see FIG. 10) and slides across the overhanging portion 52a of the horizontal plate portion 52 to be inserted into the current tape cartridge accommodating space 100 via the inlet portion 101 from the Y2 side. Thus, the current tape cartridge 10 may be held within the tape cartridge holder 50 while being supported by the horizontal plate portion 52 with its sides being held in place by the side plate portions 53 and 54, and its upper face 10a being held by the cartridge upper face holding member 60 as is shown in FIGS. 2B, 9 and 10.

When the current tape cartridge 10 passes through the inlet portion 101, the lower face of the current tape cartridge 10 pushes down the cartridge detecting pins 84 and 84A in the Z2 direction and the first lock lever 82 is rotated in the counterclockwise direction so that the hook portion 83 is unlatched from the lock pin 61 and the first lock mechanism is unlocked. However, the second lock mechanism 90 remains locked, and the cartridge upper face holding member 60 is maintained at its initial position. Accordingly, the current tape cartridge 10 may be properly inserted into the tape cartridge holder 50 to be properly accommodated within the current tape cartridge accommodating space 100.

Then, a tape cartridge automatic loading mechanism (not shown) is operated so that the tape cartridge holder 50 may be moved to a predetermined position. In turn, the current tape cartridge 10 is moved along with the tape cartridge holder 50 to the predetermined position to be loaded into the streamer apparatus 30. In this process, the lid 12 is opened by a lever 129 (see FIG. 3).

[Insertion of New Tape Cartridge]

An operator may hold a rear side portion of the new tape cartridge 20 to insert the front side portion of this new tape cartridge 20 into a loading slot 121 of a front panel 120.

In turn, the front portion of the current tape cartridge 10 pushes open the flaps 125 and 126 and slides across the overhanging portion 52a in the Y2 direction. At this point, the lower face of the new tape cartridge 20 pushes down the cartridge detecting pins 84 and 84A in the Z2 direction, and the upper face of the new tap cartridge 20 pushes up the cartridge detecting pins 93 and 93A in the Z1 direction. Accordingly, the first lock lever 82 is rotated in the counterclockwise direction and the second lock lever 91 is rotated in the clockwise direction so that the hook portions 83 and 93 are unlatched from the lock pin 61 and the first lock mechanism and the second lock mechanism are unlocked. In turn, the cartridge upper face holding member 60 moves in the Y1 direction.

Figure 11:
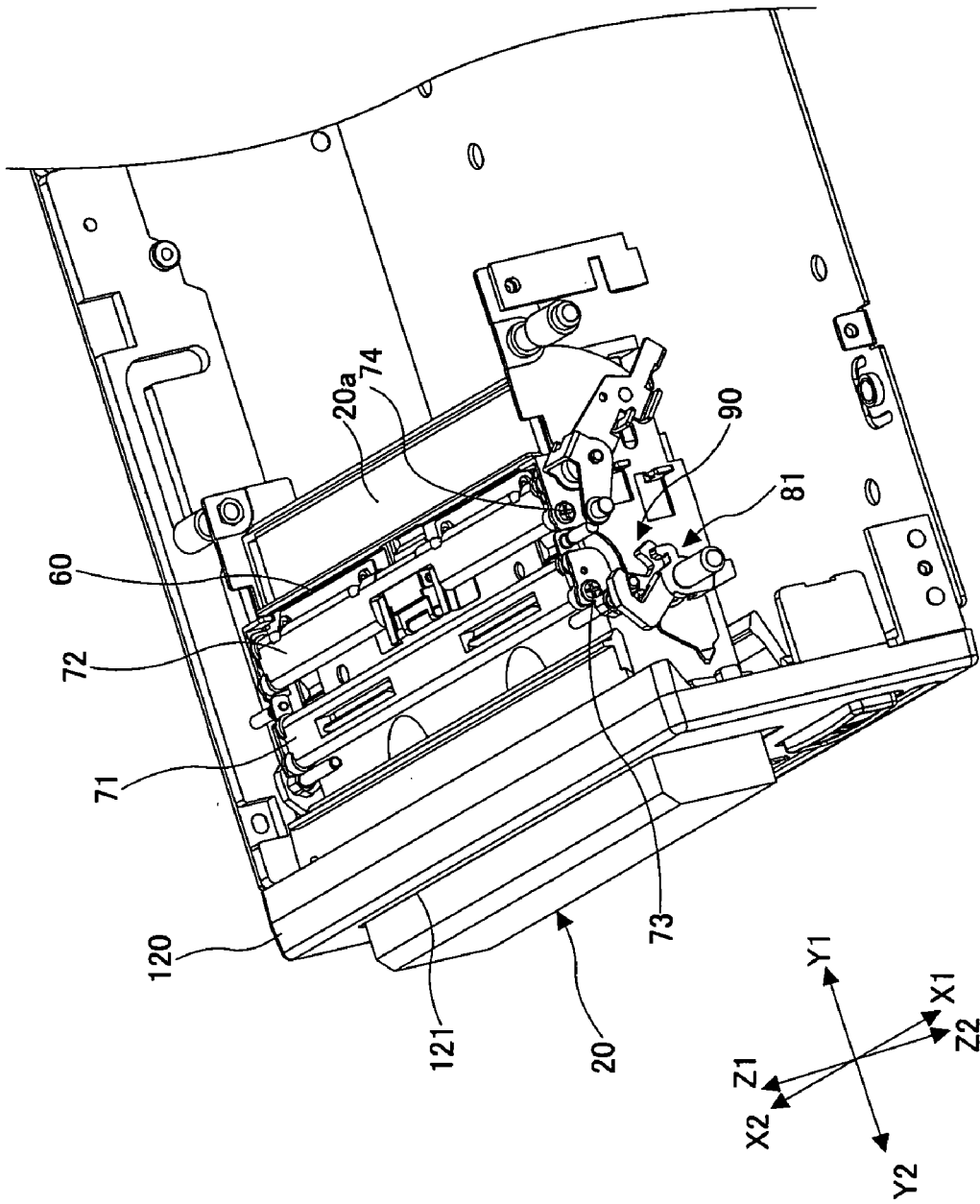
FIG. 11 is a perspective view of the tape cartridge holder according to the first embodiment where the new tape cartridge is inserted.

It is noted that the front end face, the upper face, and the corner edges of the new tape cartridge 20 hit against the Y2 side end of the cartridge upper face holding member 60 so that the cartridge upper face holding member 60 is pushed in the Y1 direction by the new tape cartridge 20. Accordingly, the cartridge upper face holding member 60 moves in the direction between the Y1 direction and the Z1 direction while being supported by the first and second suspending members 71 and 72 that are configured to rotate in a pendulum-like manner. When the cartridge upper face holding member 60 moves up to be positioned higher than the upper face of the new tape cartridge 20, the new tape cartridge 20 moves underneath the lower face of the cartridge upper face holding member 60 to be inserted into the new tape cartridge accommodating space 110. Thus, the new tape cartridge 20 may be held within the tape cartridge holder 50 while being supported by the horizontal plate portion 52 with its sides being held in place by the side plate portions 53 and 54, and its upper face 20a being held by the cartridge upper face holding member 60 as is shown in FIGS. 2C, 11 and 12.

Then, a tape cartridge automatic loading mechanism (not shown) is operated so that the tape cartridge holder 50 may be moved to a predetermined position. In turn, the new tape cartridge 20 is moved along with the tape cartridge holder 50 to the predetermined position to be loaded into the streamer apparatus 30. In this process, the lid 22 is opened by the lever 129.

It is noted that when the first and second suspending members 71 and 72 rotate in a pendulum-like manner, the arm portions 71a and 71b are configured to move in sync with each other, and the arm portions 72a and 72b are configured to move in sync with each other. In this way, the cartridge upper face holding member 60 may be maintained in a horizontal position while being moved, and the new tape cartridge accommodating space may be created smoothly.

[Preventive Measures Against Inappropriate Insertion of Current Tape Cartridge 10]

It is noted that the loading slot 121 of the front panel 120 is arranged to be in conformity with the dimensions of the new tape cartridge 20. Therefore, the height at which the current tape cartridge 10 is inserted cannot be controlled by the loading slot 121 of the front panel 120 and the insertion position of the current tape cartridge 10 may vary. Accordingly, arrangements are made so that when the current tape cartridge 10 is inserted from a high position to be near the upper side of the loading slot 121 of the front panel 120, the cartridge detecting pins 93 and 93A are pushed so that the second lock mechanism 90 is unlocked but the cartridge detecting pins 84 and 84A are not pushed so that the first lock mechanism 81 remains locked. In such a case, even when the current tape cartridge 10 is inserted with force, the current tape cartridge 10 hits against the Y2 side end of the cartridge upper face holding member 60 so that it may be prevented from being inserted further. In this way, inappropriate insertion of the current tape cartridge 10 may be prevented.

It is noted that the loading slot 121 is normally closed by the flaps 125 and 126.

Embodiment 2

Figure 14:
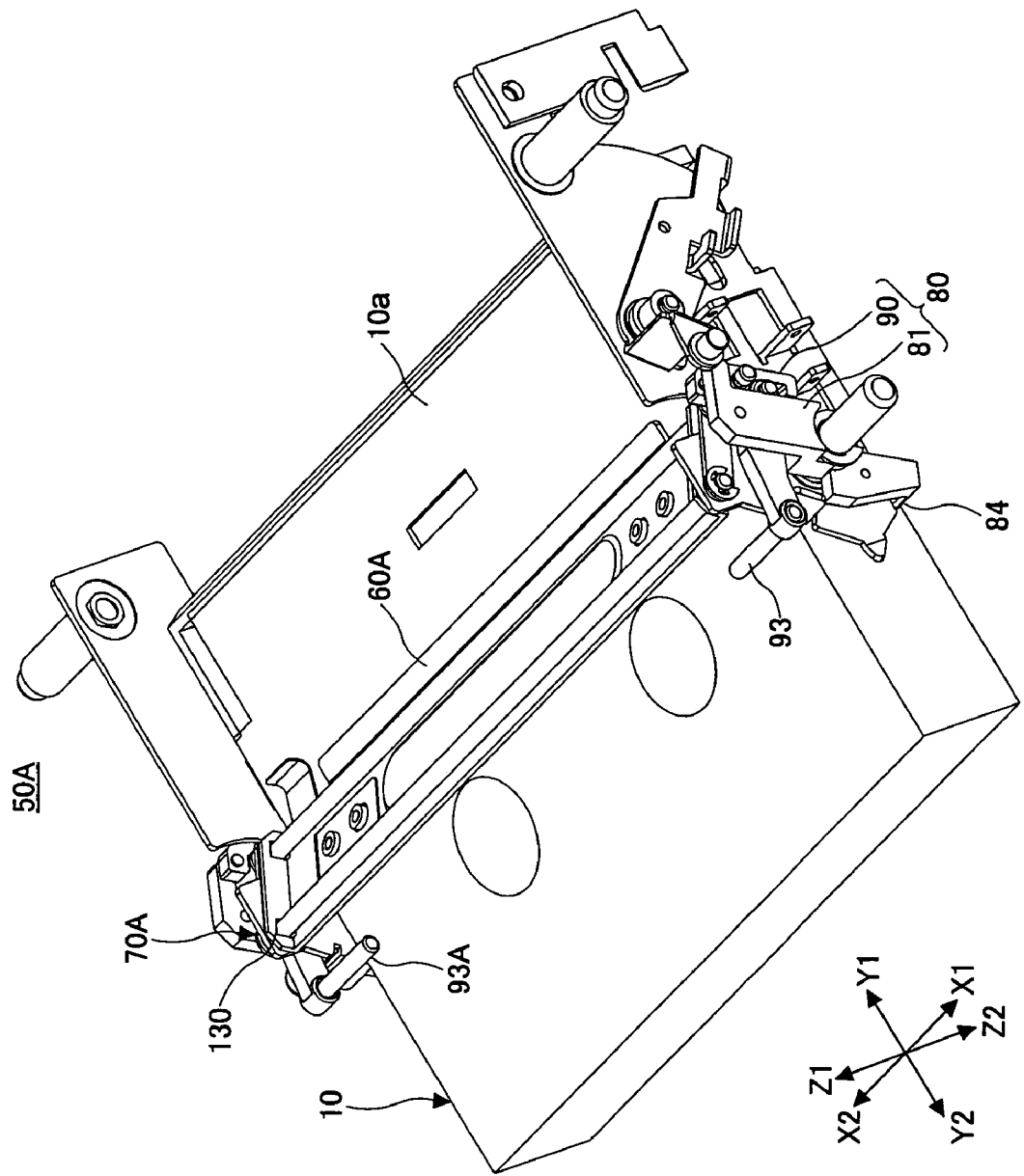
FIG. 14 is a perspective view of the tape cartridge holder according to the second embodiment where the current tape cartridge is inserted.
Figure 15:
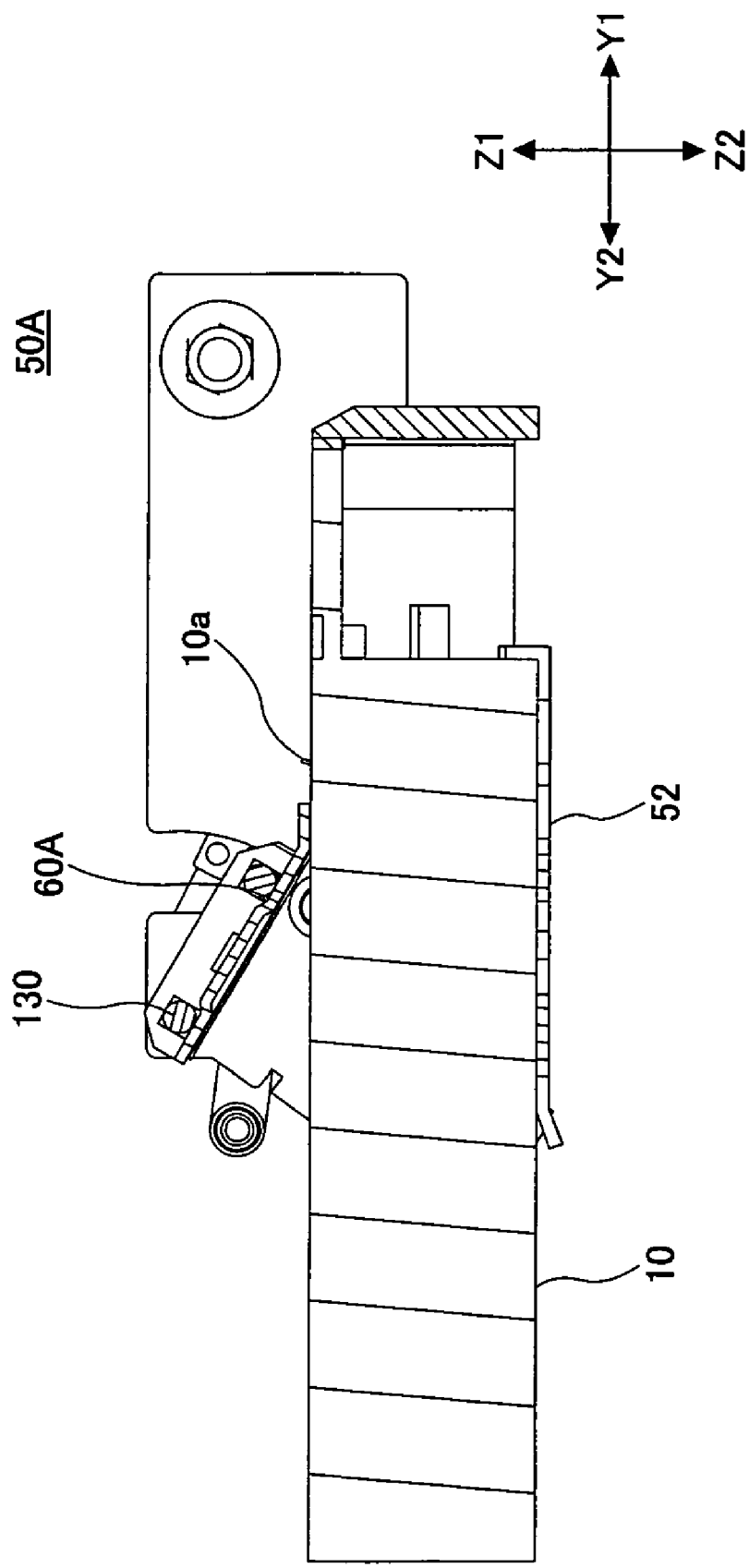
FIG. 15 is a side view of the cartridge holder according to the second embodiment as shown in FIG. 14.
Figure 16:
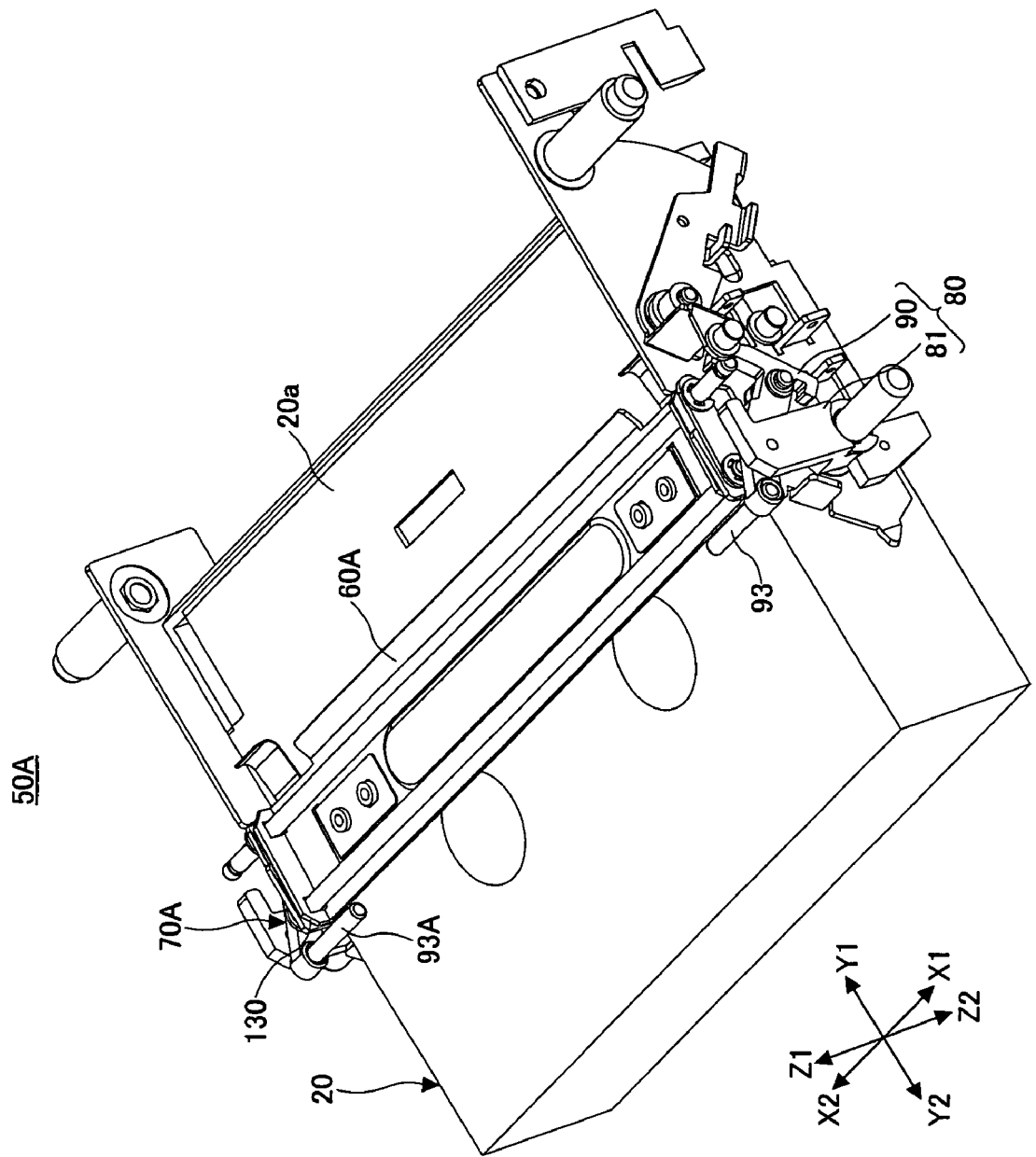
FIG. 16 is a perspective view of the tape cartridge holder according to the second embodiment where the new tape cartridge is inserted.
Figure 17:
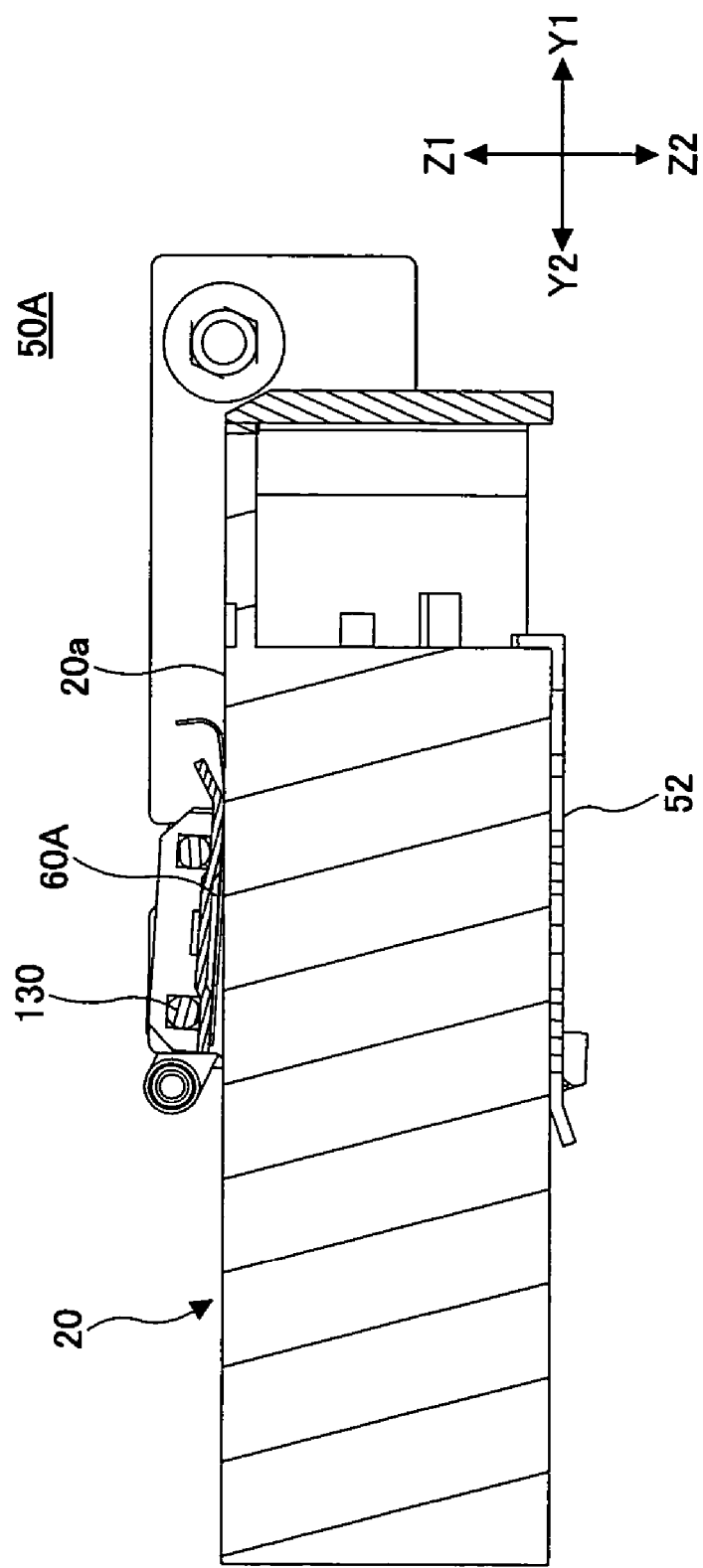
FIG. 17 is a side view of the cartridge holder according to the second embodiment as shown in FIG. 16.

FIGS. 13A-13C are skeleton diagrams of a tape cartridge holder 50A according to a second embodiment of the present invention. FIGS. 13B, 14, and 15 are diagrams showing a state in which the current tape cartridge 10 is inserted into the tape cartridge holder 50A, and FIGS. 13C, 16, and 17 are diagrams showing a state in which the new tape cartridge 20 is inserted into the tape cartridge holder 50A.

The tape cartridge holder 50A of the present embodiment includes a cartridge upper face holding member 60A and a cartridge upper face holding member supporting mechanism 70A that differ from the cartridge upper face holding member 60 and the cartridge upper face holding member supporting mechanism 70 of the tape cartridge holder 50 according to the first embodiment. It is noted that other components of the tape cartridge holder 50A that are identical to those described in relation to the first embodiment are given the same numerical references.

As is shown in FIGS. 13A, 14, and 15, the cartridge upper face holding member supporting mechanism 70A is configured to rotatably support the Y2 side of the cartridge upper face holding member 60A to the side plate portions 53 and 54 of a cartridge supporting member 51. The cartridge upper face holding member supporting mechanism 70A is realized by a shaft supporting portion 130 disposed near the loading slot 121 that supports the cartridge upper face holding member 60A. The cartridge upper face holding member 60A is locked in place in a diagonal position with its Y1 side tilted downward in the Z2 direction.

In the case where the current tape cartridge 10 is inserted into the tape cartridge holder 50A, the first lock mechanism 81 is unlocked but the second lock mechanism remains locked, and the cartridge upper face holding member 60A in the diagonally oriented position holds down the upper face of the current tape cartridge 10 as is shown in FIGS. 13B, 14, and 15. In this way, the current tape cartridge 10 may be properly inserted and held inside the tape cartridge holder 50A.

In the case where the new tape cartridge 20 is inserted, both the first lock mechanism 81 and the second lock mechanism 90 are unlocked, and the cartridge upper face holding member 60A is pushed by the new tape cartridge 20 to thereby rotate in the counterclockwise direction to be at a substantially horizontal position as is shown in FIGS. 13C, 16, and 17. In this way, the new tape cartridge may be properly inserted and held inside the tape cartridge holder 50A.

Embodiment 3

Figure 19:
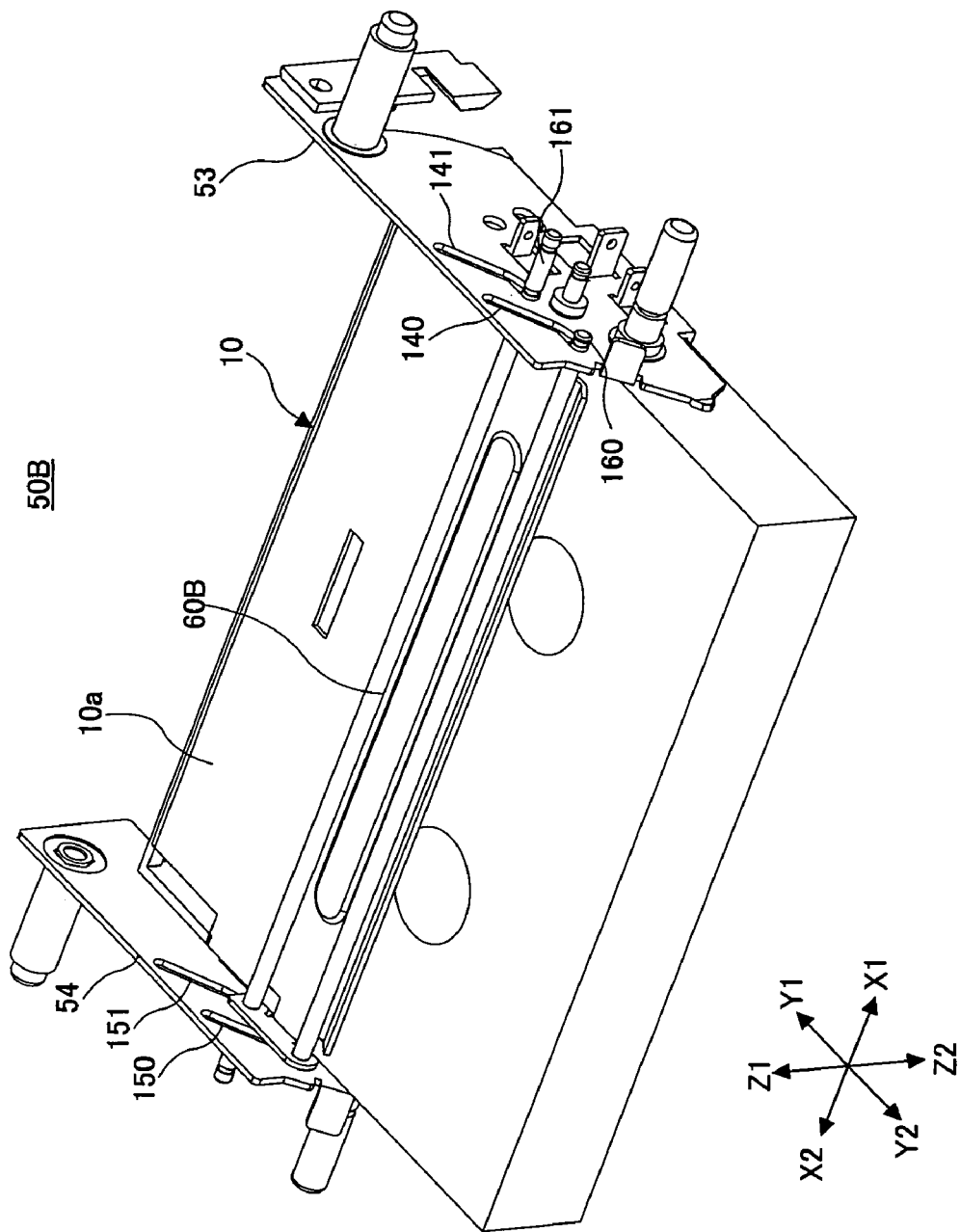
FIG. 19 is a perspective view of the tape cartridge holder according to the third embodiment where the current tape cartridge is inserted.
Figure 20:
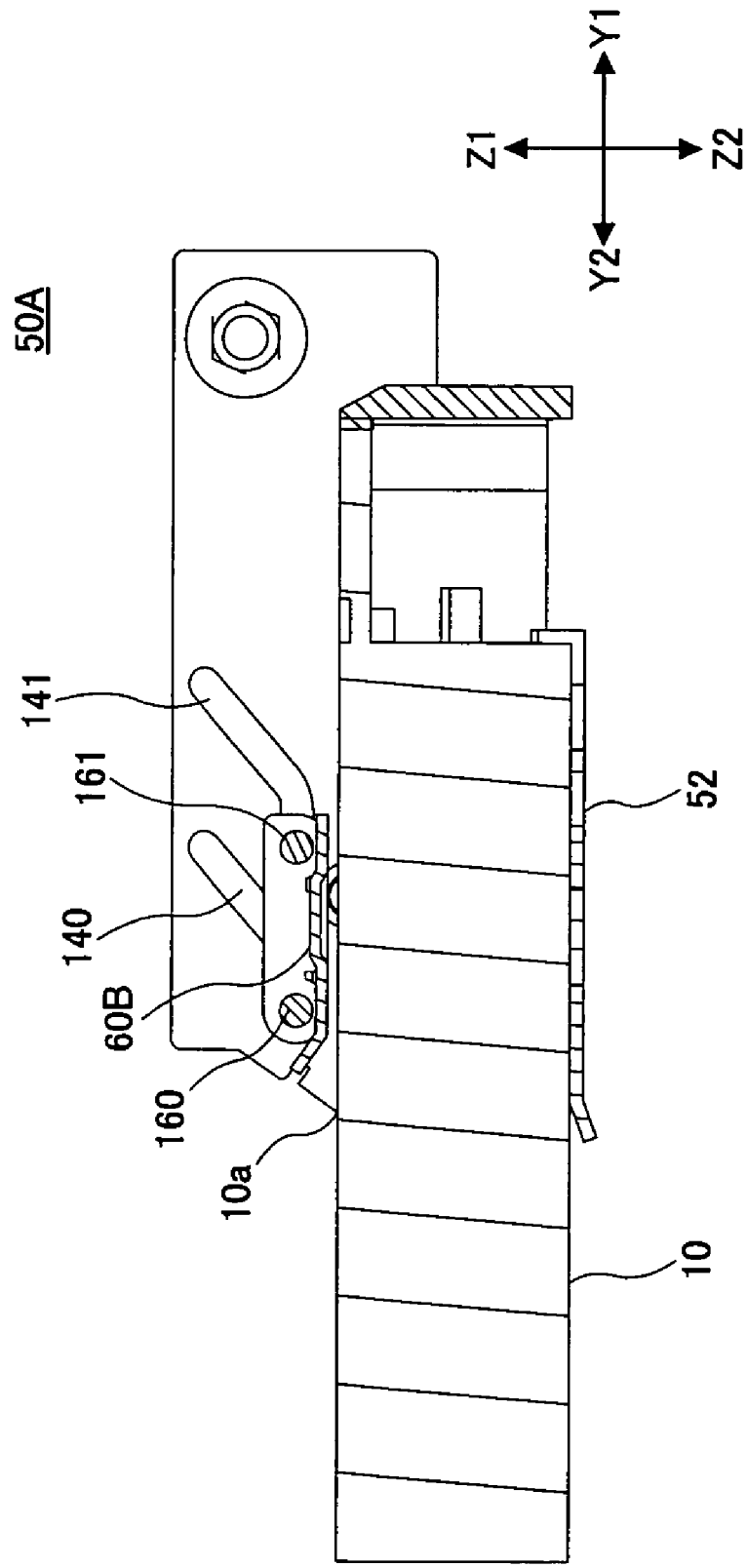
FIG. 20 is a side view of the cartridge holder according to the third embodiment as shown in FIG. 19.
Figure 21:
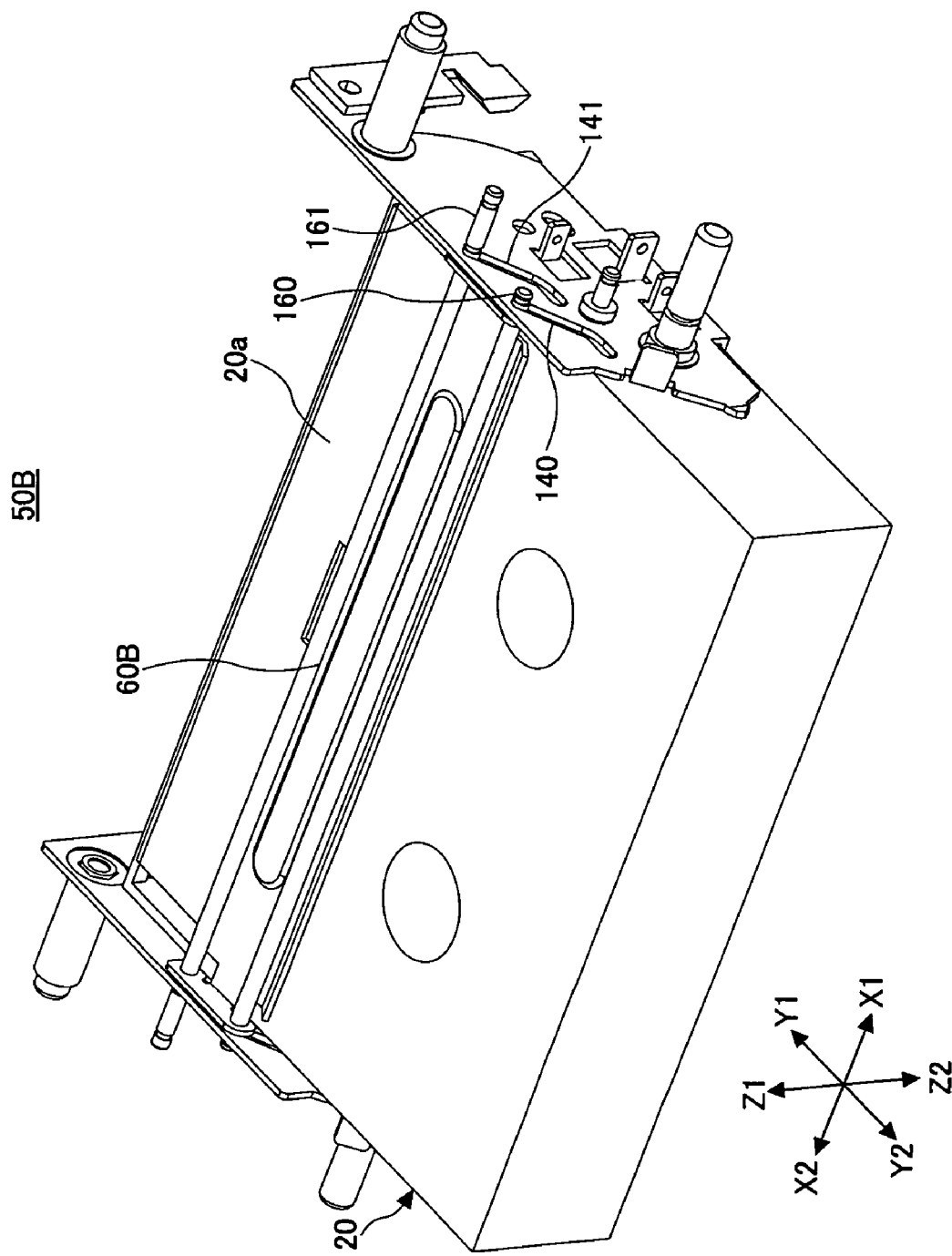
FIG. 21 is a perspective view of the tape cartridge holder according to the third embodiment where the new tape cartridge is inserted.
Figure 22:
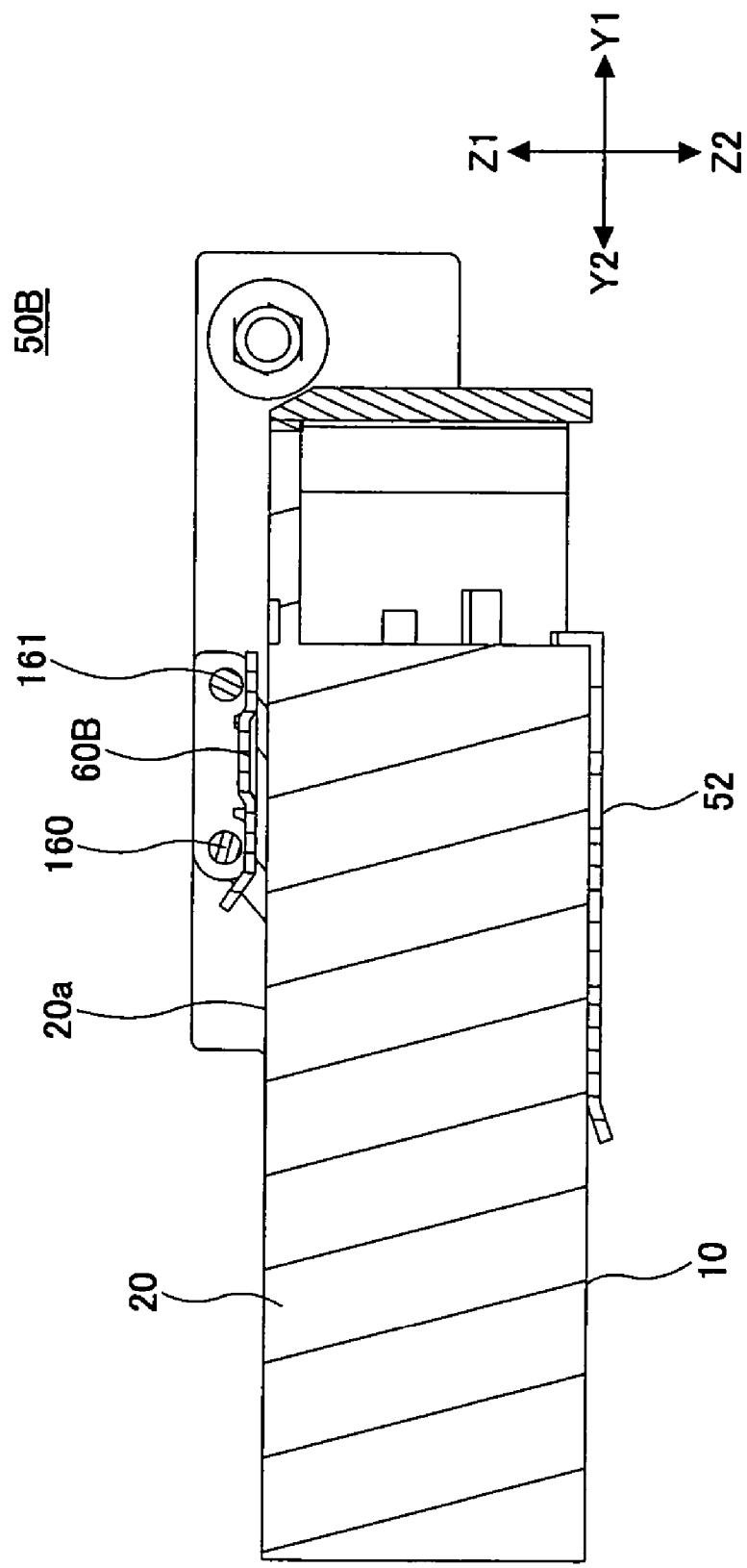
FIG. 22 is a side view of the cartridge holder according to the third embodiment as shown in FIG. 21.

FIGS. 18A-18C are skeleton diagrams of a tape cartridge holder 50B according to a third embodiment of the present invention. FIGS. 18B, 19, and 20 are diagrams showing a state in which the current tape cartridge 10 is inserted into the tape cartridge holder 50B, and FIGS. 18C, 21, and 22 are diagrams showing a state in which the new tape cartridge 20 is inserted into the tape cartridge holder 50B.

The tape cartridge holder 50B of the present embodiment includes a cartridge upper face holding member 60B and a cartridge upper face holding member supporting mechanism 70B that differ from the cartridge upper face holding member 60 and the cartridge upper face holding member supporting mechanism 70 of the tape cartridge holder 50 according to the first embodiment. It is noted that components of the tape cartridge holder 50B that are identical to those described in relation to the first embodiment are given the same numerical references.

As is shown in FIGS. 18A, 19, and 20, the cartridge upper face holding member supporting mechanism 70B is realized by two pairs of parallel guide holes 140, 141, and 150, 151 that are respectively arranged at side plate portions 53 and 54 of a cartridge supporting member 51 and are diagonally oriented such that their Y1 sides tilt upward in the Z1 direction. The cartridge upper face holding member 60B is supported by rods 160 and 161 the ends of which rods 160 and 161 are engaged with the guide holes 140, 141, 150, and 151 so that the cartridge upper face holding member 60B may be moved while being guided by the guide holes 140, 141, 150, and 151.

In the case where the current tape cartridge 10 is inserted into the tape cartridge holder 50B, the first lock mechanism 81 is unlocked but the second lock mechanism remains locked, and the cartridge upper face holding member 60B disposed at its initial position holds down the upper face of the current tape cartridge 10 as is shown in FIGS. 18B, 19, and 20. In this way, the current tape cartridge 10 may be properly inserted and held inside the tape cartridge holder 50B.

In the case where the new tape cartridge 20 is inserted, both the first lock mechanism 81 and the second lock mechanism 90 are unlocked, and the cartridge upper face holding member 60B is pushed by the new tape cartridge 20 to thereby move along the upper diagonal direction of the guide holes 140, 141, 150, and 151 as is shown in FIGS. 18C, 21, and 22. In this way, the new tape cartridge 20 may be properly inserted and held inside the tape cartridge holder 50B.

Further, it is noted that the present invention is not limited to the specific embodiments described above, and variations and modifications may be made without departing from the scope of the present invention.

The present application is based on and claims the benefit of the earlier filing date of Japanese Patent Application No.

2005-175549 filed on Jun. 15, 2005, the entire contents of which are hereby incorporated by reference.

What is claimed is:

1. A cartridge holder into which one of a first cartridge and a second cartridge having a greater dimension than the first cartridge is selectively inserted, the cartridge holder comprising:
   a cartridge supporting member that includes a horizontal plate portion, a first side plate portion, and a second side plate portion, which portions support a bottom face, a first side face, and a second side face, respectively, of an inserted cartridge corresponding to one of the first cartridge and the second cartridge;
   a cartridge upper face holding member configured to hold down an upper face of the inserted cartridge which cartridge upper face holding member is normally positioned at a first height position for holding down an upper face of the first cartridge;
   a cartridge upper face holding member supporting mechanism configured to support the cartridge upper face holding member and move the cartridge upper face holding member in a direction for changing a height position of the cartridge upper face holding member with respect to the cartridge supporting member; and
   a lock mechanism configured to lock the cartridge upper face holding member in the first height position;
   wherein the cartridge supporting member and the cartridge upper face holding member define a cartridge accommodating space for accommodating the inserted cartridge;
   the lock mechanism is configured to remain locked when the first cartridge is inserted, and be unlocked when the second cartridge is inserted; and
   when the second cartridge is inserted, the cartridge upper face holding member is moved to a second height position that is higher than the first height position, and a size of the cartridge accommodating space is changed to correspond to a size of the second cartridge.

2. The cartridge holder as claimed in claim 1, wherein the lock mechanism includes a first lock mechanism and a second lock mechanism; the first lock mechanism is configured to be unlocked when the first cartridge is inserted and when the second cartridge is inserted; and
   the second lock mechanism is configured to be unlocked when the second cartridge is inserted.

3. The cartridge holder as claimed in claim 1, wherein the cartridge upper face holding member supporting mechanism includes a first suspending member and a second suspending member that are configured to suspend the cartridge upper face holding member at two separate positions with respect to a cartridge inserting direction; and
   the first suspending member and the second suspending member are configured to rotate when the second cartridge is inserted, and the cartridge upper face holding member is moved by the rotational movement of the first suspending member and the second suspending member.

4. The cartridge holder as claimed in claim 1, wherein the cartridge upper face holding member is arranged into a rectangular shape with four corners; the cartridge upper face holding member supporting mechanism includes four arm portions that suspend the four corners of the cartridge upper face holding member, at least two of the arm portions positioned at opposing ends of a long side of the cartridge upper face holding member being configured to rotate in sync with each other; and
   the cartridge upper face holding member is moved by the synchronized rotational movement of the arm portions positioned at the opposing ends.

5. The cartridge holder as claimed in claim 1, wherein the cartridge upper face holding member supporting mechanism includes a shaft supporting portion that is configured to rotatably support one side of the cartridge upper face holding member to the first side plate portion and the second side plate portion of the cartridge supporting member, said one side corresponding to a side of the cartridge upper face holding member close to a cartridge loading slot from which one of the first cartridge and the second cartridge is selectively inserted; and
   when the second cartridge is inserted, the cartridge upper face holding member rotates with respect to the shaft supporting portion and changes the size of the cartridge accommodating space to correspond to the size of the second cartridge.

6. The cartridge holder as claimed in claim 1, wherein the cartridge upper face holding member supporting mechanism is realized by a plurality of diagonal holes formed at the first side plate portion and the second side plate portion of the cartridge supporting member, and a rod having side ends that are engaged with the diagonal holes which rod is configured to be guided by the diagonal holes; and when the second cartridge is inserted, the cartridge upper face holding member moves along a diagonal direction of the diagonal holes and changes the size of the cartridge accommodating space to correspond to the size of the second cartridge.

7. A magnetic recording/playback apparatus comprising:
   a cartridge holder into which one of a first cartridge and a second cartridge having a greater dimension than the first cartridge is selectively inserted, the cartridge holder including a cartridge supporting member that includes a horizontal plate portion, a first side plate portion, and a second side plate portion, which portions support a bottom face, a first side face, and a second side face, respectively, of an inserted cartridge. corresponding to one of the first cartridge and the second cartridge;
   a cartridge upper face holding member configured to hold down an upper face of the inserted cartridge which cartridge upper face holding member is normally positioned at a first height position for holding down an upper face of the first cartridge;
   a cartridge upper face holding member supporting mechanism configured to support the cartridge upper face holding member and move the cartridge upper face holding member in a direction for changing a height position of the cartridge upper face holding member with respect to the cartridge supporting member; and a lock mechanism configured to lock the cartridge upper face holding member in the first height position;
   wherein the cartridge supporting member and the cartridge upper face holding member define a cartridge accommodating space for accommodating the inserted cartridge;
   the lock mechanism is configured to remain locked when the first cartridge is inserted, and be unlocked when the second cartridge is inserted; and
   when the second cartridge is inserted, the cartridge upper face holding member is moved to a second height position that is higher than the first height position, and a size of the cartridge accommodating space is changed to correspond to a size of the second cartridge.

* * * * *